(12) United States Patent
Igarashi

(10) Patent No.: US 9,727,290 B2
(45) Date of Patent: Aug. 8, 2017

(54) MANAGEMENT APPARATUS AND METHOD FOR SETTING DATA VALUES ON AN INFORMATION PROCESSING APPARATUS

(71) Applicant: CANON KABUSHIKI KAISHA, Tokyo (JP)

(72) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/880,548

(22) Filed: Oct. 12, 2015

(65) Prior Publication Data
US 2016/0105573 A1 Apr. 14, 2016

(30) Foreign Application Priority Data
Oct. 14, 2014 (JP) ................................. 2014-209794

(51) Int. Cl.
G06F 3/12 (2006.01)
(52) U.S. Cl.
CPC .......... *G06F 3/1288* (2013.01); *G06F 3/1203* (2013.01); *G06F 3/1231* (2013.01)
(58) Field of Classification Search
CPC ........ H04N 1/00344; H04N 2201/0094; G06F 3/1203; G06F 3/1231; G06F 3/1288; G06F 8/61

USPC ....... 358/1.15, 504; 717/103, 120, 170, 172, 717/174, 176, 177, 178
See application file for complete search history.

(56) References Cited

U.S. PATENT DOCUMENTS
2006/0287740 A1* 12/2006 Ertel ....................... A61B 90/90
700/65

FOREIGN PATENT DOCUMENTS
JP 2011180772 A 9/2011
JP 2012226662 A 11/2012

* cited by examiner

*Primary Examiner* — Jamares Q Washington
(74) *Attorney, Agent, or Firm* — Canon U.S.A., Inc. IP Division

(57) ABSTRACT

A management apparatus configured to communicate with a plurality of information processing apparatuses generates common data to be set into the plurality of information processing apparatuses in common and individual data to be individually set into any one of the plurality of information processing apparatuses, in such a manner that the common data and the individual data are associated with an installation location, identification information for identifying an information processing apparatus to be set being not finalized for the any one of the plurality of information processing apparatuses. The management apparatus registers and manages the common data and the individual data in a storage unit.

13 Claims, 35 Drawing Sheets

<?xml version="1.0" encoding="UTF-8"?>
<DeviceSettings>

<ControlData>
    <Model>Device A</Model>                           601
    <SerialNo>A001</SerialNo>
</ControlData>

<Data>
    <SleepTime>10</SleepTime>
    <IPAddress>10.10.10.10</IPAddress>                602
    <Location>2F North Side</Location>
</Data>

</DeviceSettings>
```

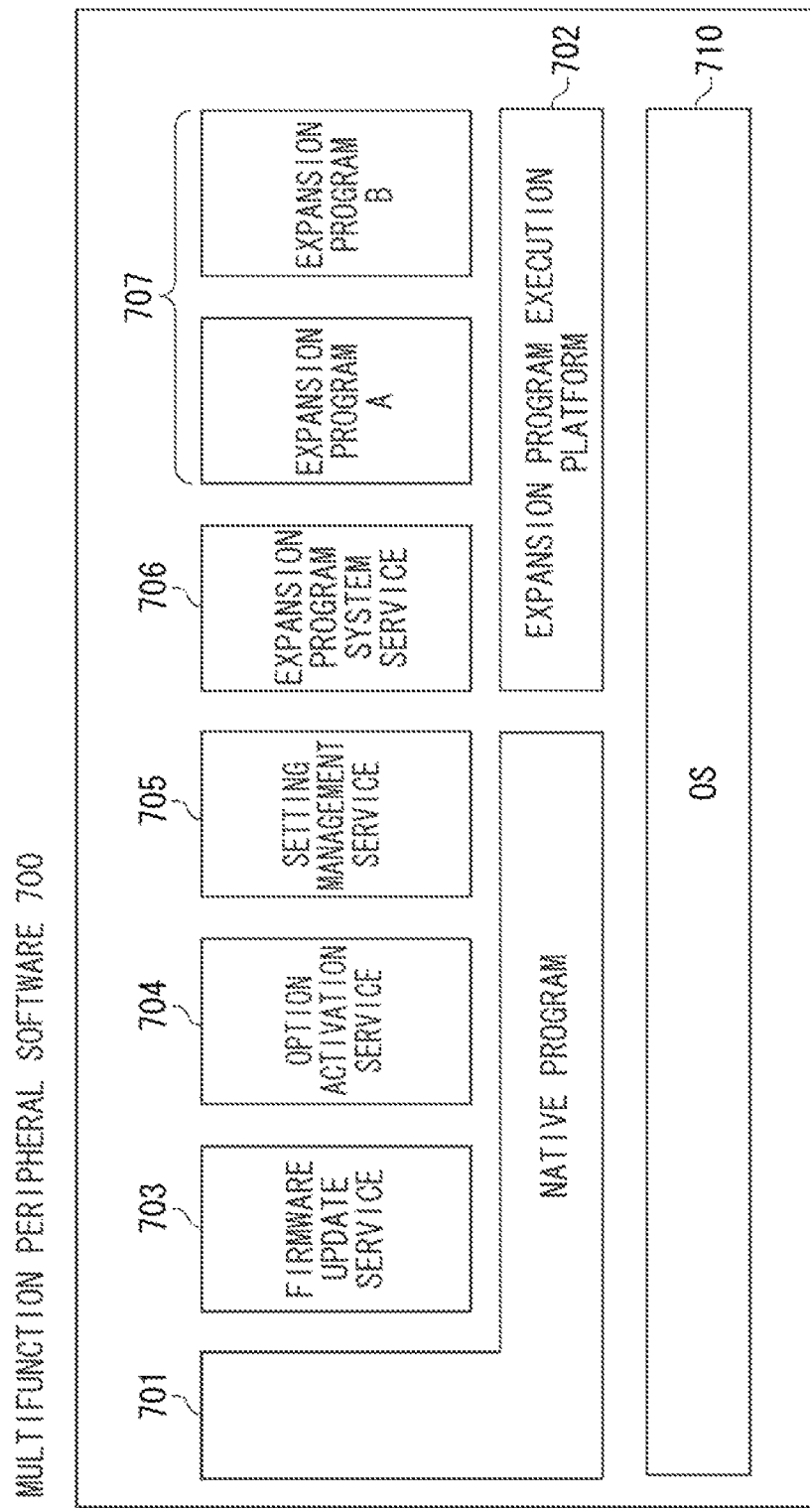

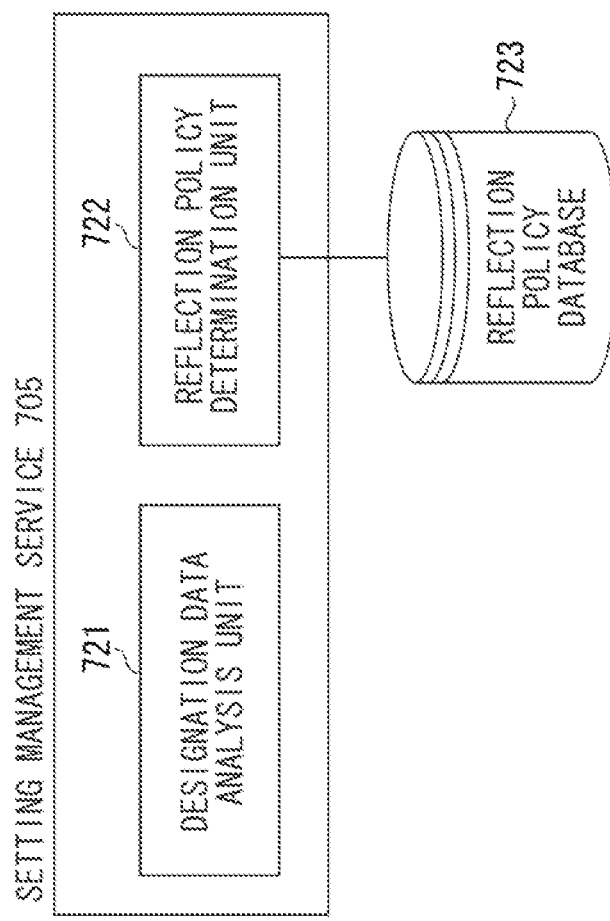

FIG. 7C

REFLECTION POLICY TABLE 730

| SETTING ITEM ID 731 | SETTING ITEM NAME 732 | TYPE 733 | VALUE RANGE 734 | INITIAL VALUE 735 | REFLECTION CONDITION 736 |
|---|---|---|---|---|---|
| Sleep Time | SLEEP TRANSITION TIME | ENUMERATED TYPE | 1, 5, 10, 20 | 10 | ALWAYS REFLECT |
| IP Address | IP ADDRESS | IP ADDRESS TYPE | — | | IF SERIAL NUMBER MATCHES |
| Location | INSTALLATION LOCATION | CHARACTER STRING TYPE | 0 TO 32 CHARACTERS | | IF SERIAL NUMBER MATCHES |
| Default Paper Size | INITIAL VALUE OF SHEET SIZE | ENUMERATED TYPE | A4, Letter, B5 | A4 | IF MODEL INFORMATION MATCHES |

FIG. 8C

INDIVIDUAL DATA SELECTION SCREEN 820

INDIVIDUAL DATA LIST

SELECT INDIVIDUAL DATA TO BE APPLIED TO THIS DEVICE

| | INDIVIDUAL DATA NAME | SUB IDENTIFICATION INFORMATION |
|---|---|---|
| ◎ | NAME d1 | NORTH SIDE 2F |
| ○ | NAME d2 | 1F |
| ○ | NAME d3 | SOUTH SIDE 2F |

822 — INDIVIDUAL DATA NAME
823 — SUB IDENTIFICATION INFORMATION
821
824 — OK

FIG. 8D

DATA CONFIRMATION SCREEN 830

DATA CONFIRMATION

THE FOLLOWING DATA WILL BE REFLECTED

| DATA TYPE | DATA NAME | SUB IDENTIFICATION INFORMATION |
|---|---|---|
| COMMON DATA | NAME C1 | — |
| INDIVIDUAL DATA | NAME d1 | NORTH SIDE 2F |

SETTING INFORMATION MANAGEMENT TABLE 900

| 901 | 902 | 903 | 904 | 905 | 906 |
|---|---|---|---|---|---|
| SETTING ITEM ID | SETTING ITEM NAME | TYPE | VALUE RANGE | INITIAL VALUE | REFLECTION CONDITION |
| Sleep Time | SLEEP TRANSITION TIME | ENUMERATED TYPE | 1, 5, 10, 20 | 10 | ALWAYS REFLECT |
| IP Address | IP ADDRESS | IP ADDRESS | -- | | IF SERIAL NUMBER MATCHES |
| Location | INSTALLATION LOCATION | CHARACTER STRING TYPE | 0 TO 32 CHARACTER | | IF SERIAL NUMBER MATCHES |
| Default Paper Size | INITIAL VALUE OF SHEET SIZE | ENUMERATED TYPE | A4, Letter, B5 | A4 | IF MODEL INFORMATION MATCHES |

FIG. 9B

CLIENT INFORMATION MANAGEMENT TABLE 910

| CLIENT ID 911 | CLIENT NAME 912 | INSTALLATION STATE 913 | COMMENT 914 |
|---|---|---|---|
| 1 | AAA | NOT COMPLETED | ... |
| 2 | BBB | COMPLETED | ... |
| 3 | CCC | COMPLETED | ... |

FIG. 9C

INFORMATION PROCESSING APPARATUS MANAGEMENT TABLE 920

| APPARATUS IDENTIFICATION INFORMATION 921 | MODEL NAME 922 | CLIENT ID 923 |
|---|---|---|
| A001 | Device A | 1 |
| A002 | Device A | 1 |
| A003 | Device B | 1 |
| A009 | Device C | 2 |

FIG. 9D

COMMON DATA MANAGEMENT TABLE 930

| COMMON DATA ID 931 | CLIENT ID 932 | COMMON DATA NAME 933 | COMMON DATA 934 |
|---|---|---|---|
| C001 | 1 | NAMEc1 | ... |
| C002 | 2 | NAMEc2 | ... |
| C003 | 3 | NAMEc3 | ... |

FIG. 9E

INDIVIDUAL DATA MANAGEMENT TABLE 940

| INDIVIDUAL DATA ID 941 | CLIENT ID 942 | INDIVIDUAL DATA NAME 943 | APPARATUS IDENTIFICATION INFORMATION 944 | SUB IDENTIFICATION INFORMATION 945 | INDIVIDUAL DATA 946 |
|---|---|---|---|---|---|
| X001 | 1 | NAME d1 | | NORTH SIDE 2F | ... |
| X002 | 1 | NAME d2 | | 1F | ... |
| X003 | 1 | NAME d3 | | SOUTH SIDE 2F | ... |
| X004 | 2 | NAME d3 | B009 | | ... |

FIG. 10A

EDIT SCREEN 1000 OF EDITING SOFTWARE 400

SETTING INFORMATION EDIT

DATA NAME: ␣␣␣␣␣␣␣␣␣␣ 1001

MODEL NAME: Device A 1002

APPARATUS IDENTIFICATION INFORMATION: A001 1003

SLEEP TRANSITION TIME: 10 MIN 1004

IP ADDRESS: 10.10.10.10 1005

INSTALLATION LOCATION: NORTH SIDE 2F 1006

1007 IMPORT   1008 EXPORT

FIG. 10B

SETTING CHANGE SCREEN 1010 OF MULTIFUNCTION
PERIPHERAL SOFTWARE 700

SETTING CHANGE

DATA NAME: _____1011

SLEEP
TRANSITION TIME: [10 MIN ▽]—1012
IP ADDRESS: [10.10.10.10]—1013
INSTALLATION
LOCATION: [NORTH SIDE 2F]—1014

1015            1016
[IMPORT]       [EXPORT]

FIG. 11B

DETAIL SCREEN 1120

DETAILS OF CLIENT INFORMATION
CLIENT NAME:AAA ~1121
DEVICE LIST  1122   1123

| APPARATUS IDENTIFICATION INFORMATION | MODEL NAME |
|---|---|
| A001 | Device A |
| A002 | Device A |
| A003 | Device B |

ADD ~1124
DELETE ~1125

COMMON DATA NAME:NAMEC1   DETAIL ~1127
1126
1128   1129   1130
IMPORT   EXPORT   DELETE

INDIVIDUAL DATA
1131   1132   1133

| INDIVIDUAL DATA | APPARATUS IDENTIFICATION INFORMATION | SUB IDENTIFICATION INFORMATION |
|---|---|---|
| AAA DETAIL | | NORTH SIDE 2F |
| BBB DETAIL | | 1F |
| CCC DETAIL | | SOUTH SIDE 2F |

1134  1135   1136   1137
IMPORT   EXPORT   DELETE

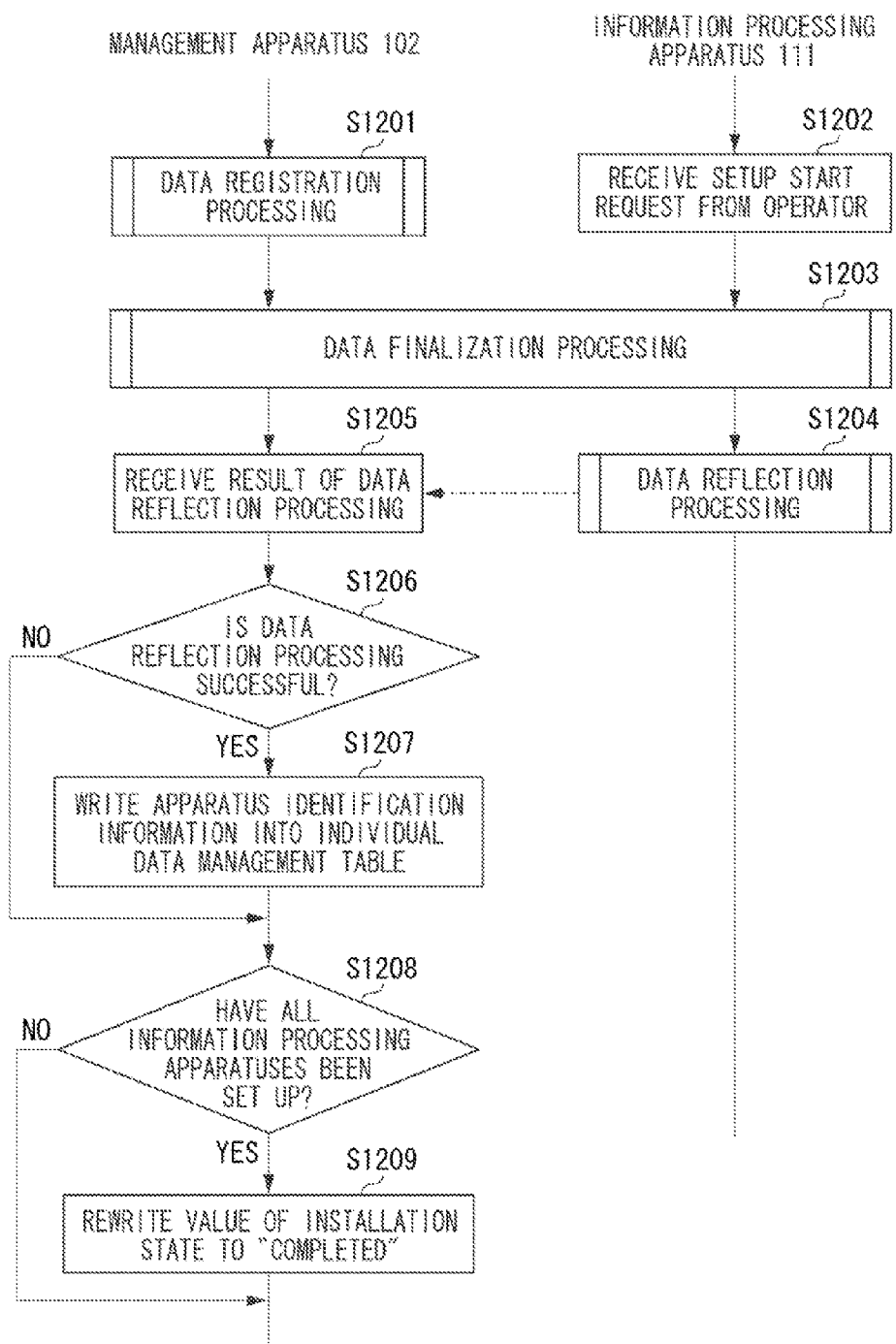

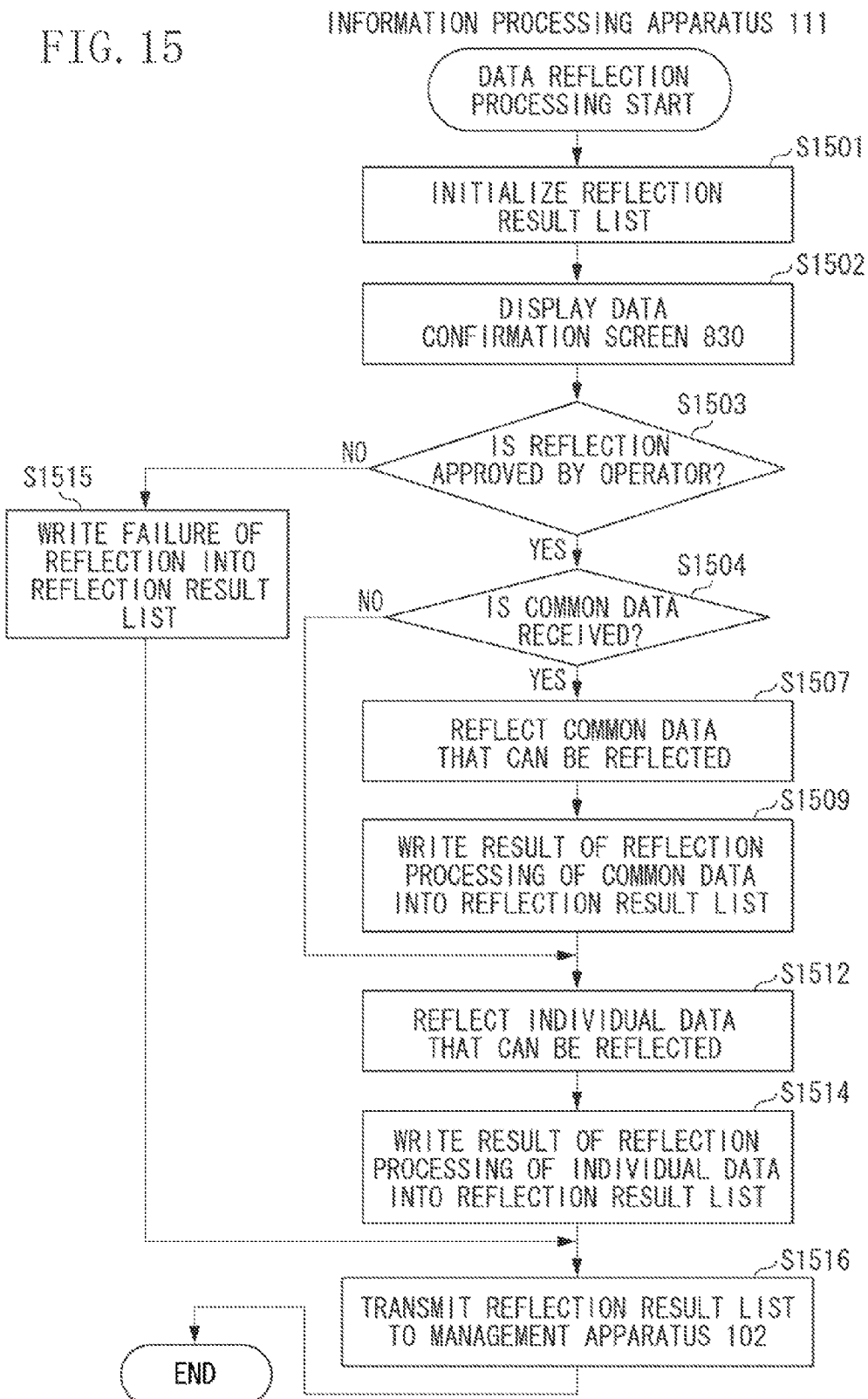

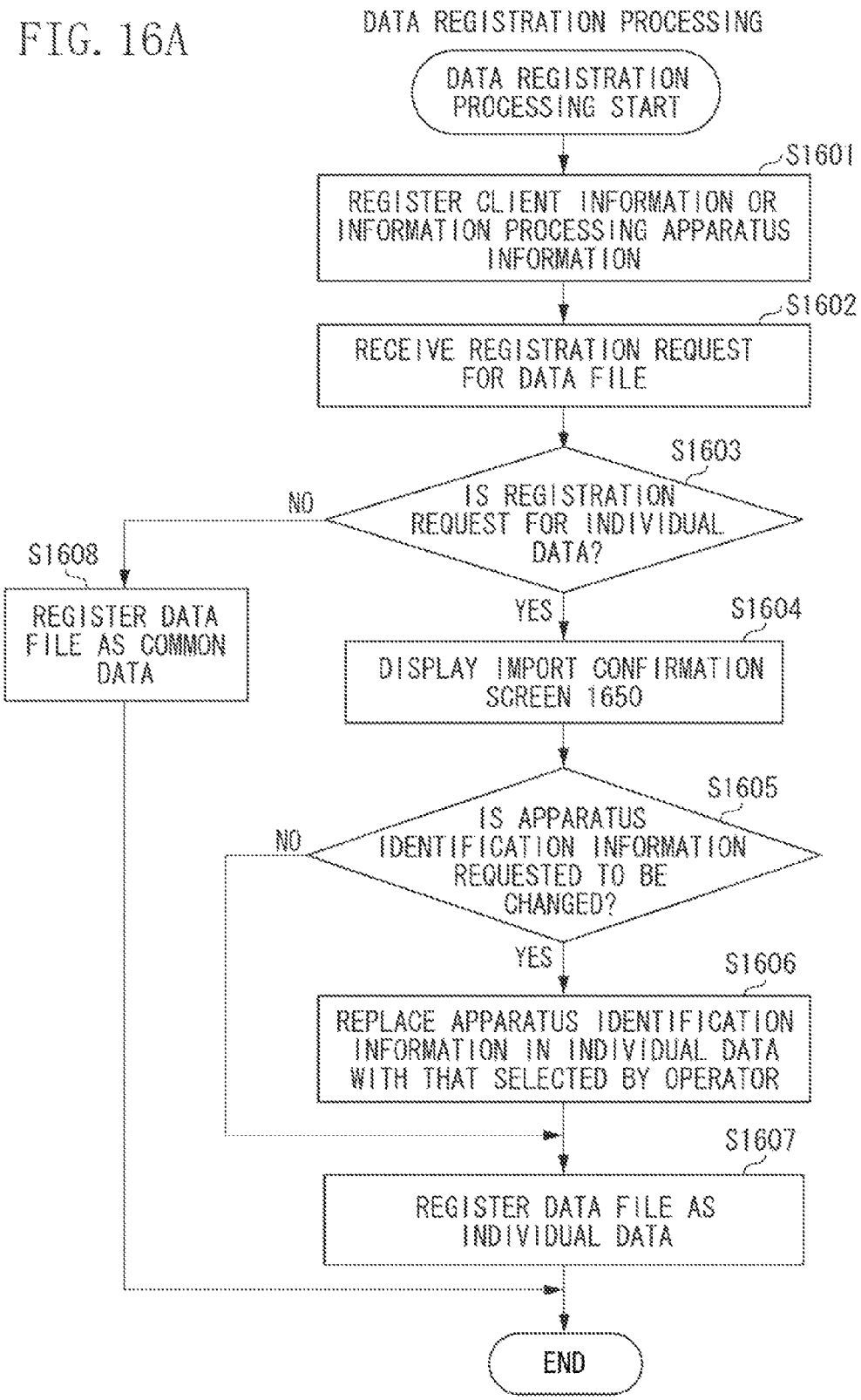

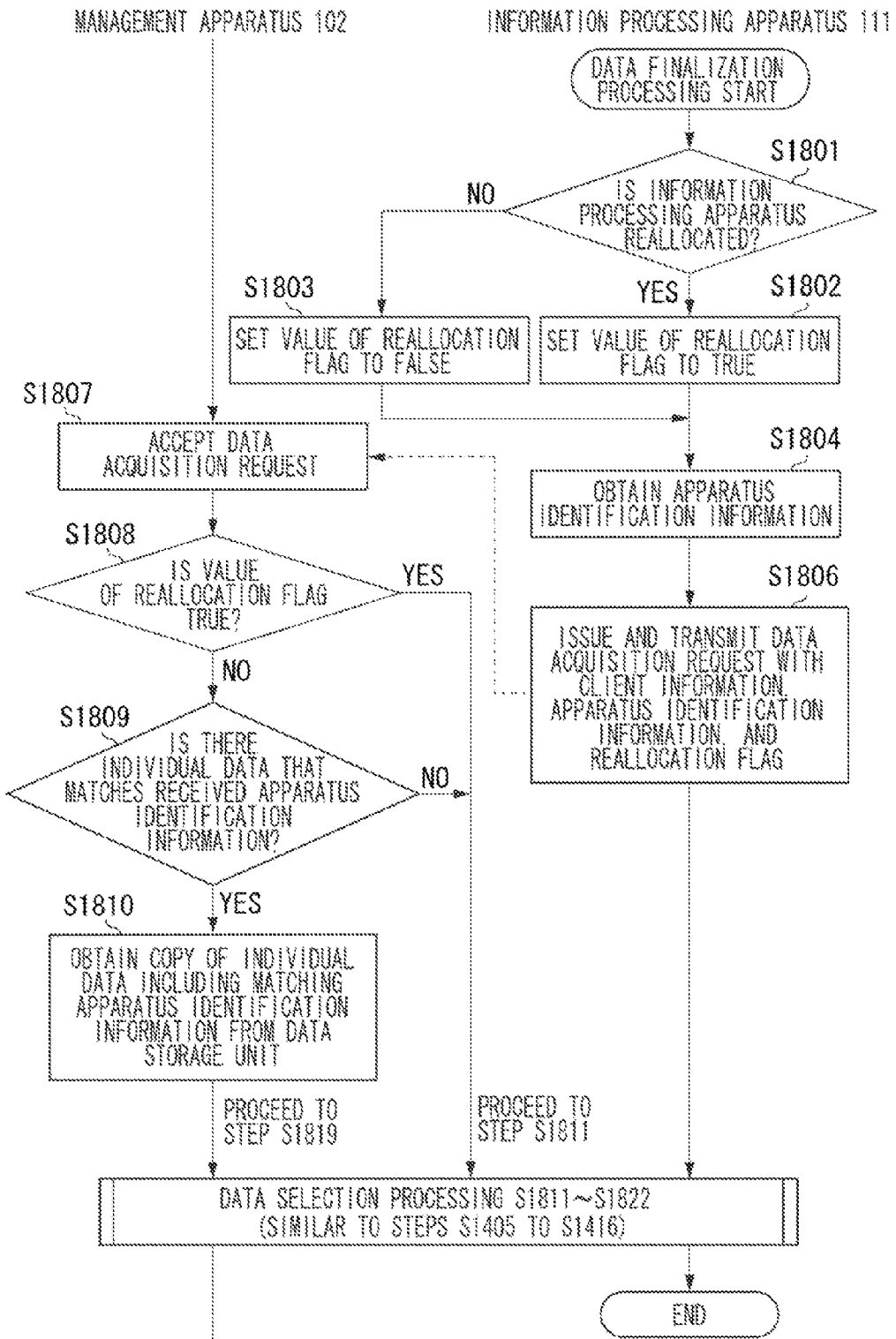

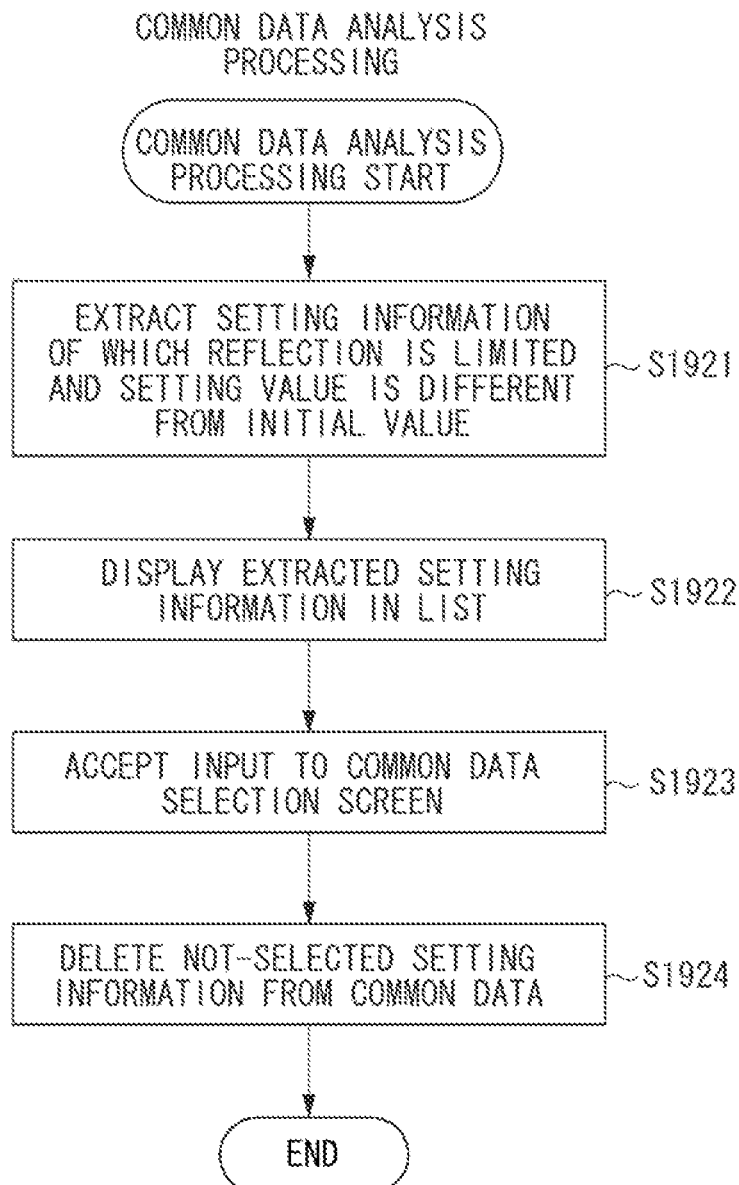

FIG. 19C

```
COMMON DATA SELECTION SCREEN 1950
```

| | SETTING ITEM | SETTING VALUE |
|---|---|---|
| ☐ | IP ADDRESS | 10.10.10.10 |
| ☐ | INSTALLATION LOCATION | NORTH SIDE 2F |
| ■ | INITIAL VALUE OF SHEET SIZE | A4 |

SELECT SETTING ITEM(S) TO BE REFLECTED AS COMMON DATA

DATA SELECTION SCREEN 2100

DATA SELECTION

SELECT INDIVIDUAL DATA TO BE
APPLIED TO THIS DEVICE

| | INDIVIDUAL DATA NAME (2102) | SUB IDENTIFICATION INFORMATION (2103) |
|---|---|---|
| ◉ | NAME d1 | NORTH SIDE 2F |
| ○ | NAME d2 | 1F |
| ○ | NAME d3 | SOUTH SIDE 2F |

2101

☐ REFLECT SETTING ITEM(S) WITH
REFLECTION CONDITION IN COMMON DATA

2104

2105 — OK

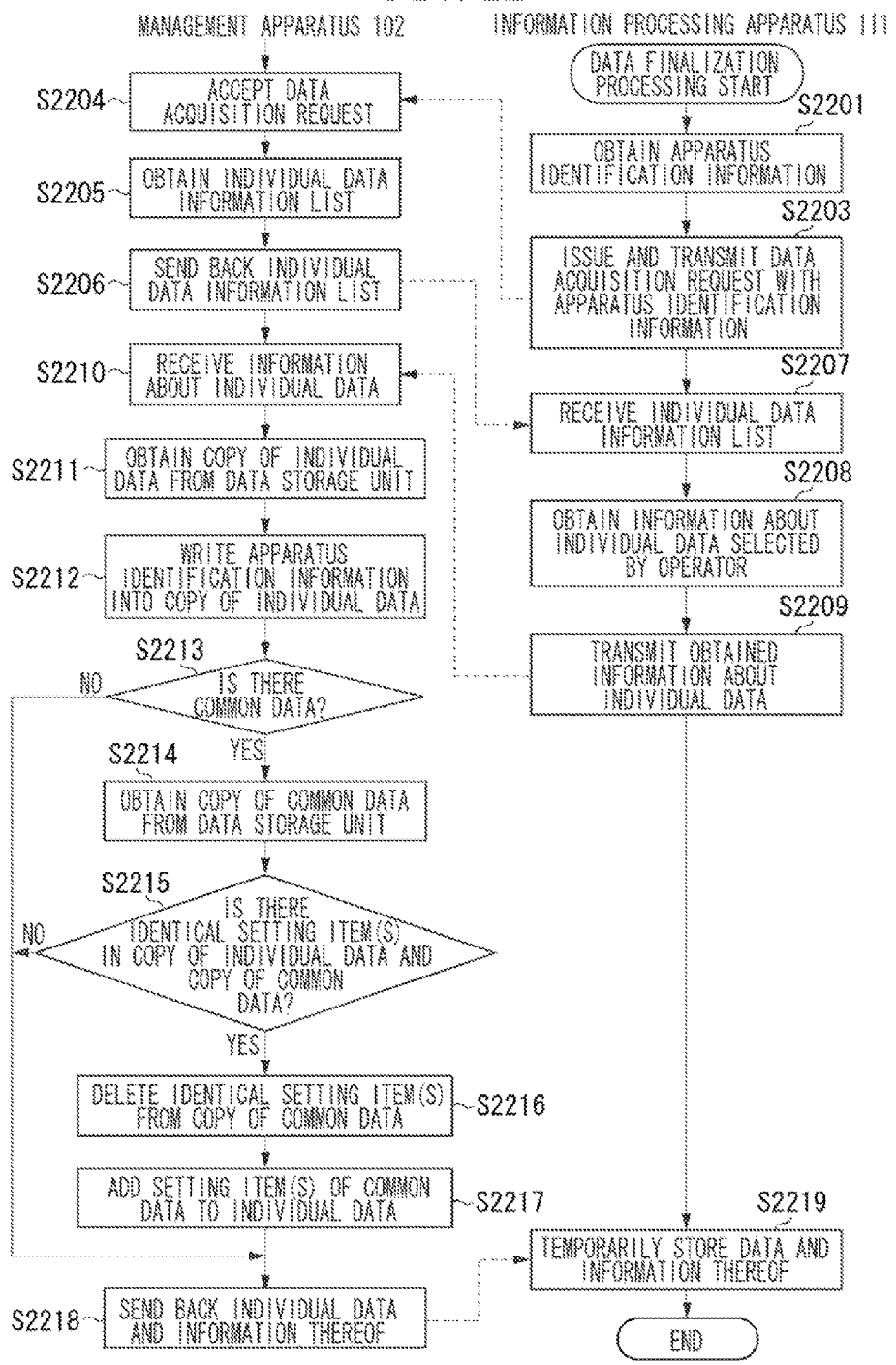

# MANAGEMENT APPARATUS AND METHOD FOR SETTING DATA VALUES ON AN INFORMATION PROCESSING APPARATUS

BACKGROUND OF THE INVENTION

Field of the Invention

The present invention relates to a management apparatus, an information processing apparatus, a method for controlling a management apparatus, a method for controlling an information processing apparatus, and a storage medium.

Description of the Related Art

Information processing apparatuses as typified by a multifunction peripheral usually need a setup operation according to a client environment when newly installed.

The setup operation of an information processing apparatus takes a lot of time and labor. In a case where similar setup operations on a plurality of information processing apparatuses are performed, necessary software, setting information, and common data, such as validation data are prepared in advance. A system that processes the software, the setting information, and the common data according to installation instruction information has been proposed so that setup operations are automatically and efficiently performed.

Japanese Patent Application Laid-Open No. 2011-180772 discusses a system in which in a case where individual settings are to be set on a respective plurality of information processing apparatuses, a host system manages a correspondence list that includes identifiers capable of identifying the target information processing apparatuses and the individual data. Individual setup operations are performed according to the correspondence list.

Japanese Patent Application Laid-Open No. 2012-226662 discusses a system in which apparatus identification information (such as a serial number) for identifying a target model is included into individual data so that setting information can be securely taken into information processing apparatuses.

According to the systems discussed in Japanese Patent Application Laid-Open Nos. 2011-180772 and 2012-226662, the individual data is often determined at the locations or departments where the information processing apparatuses are installed. For example, the names of the installation locations and the information processing apparatuses vary depending on the very floor or department of installation. Address books to be registered can also be different from each other.

When installing information processing apparatuses in a client environment, an operator usually simply places arbitrary ones of delivered information processing apparatuses in designated locations. The layout locations and the respective information processing apparatuses are not associated with each other in advance. In such a case, individual data including apparatus identification information is not able to be generated in advance. In other words, even if the operator selects and reflects appropriate individual data on the information processing apparatuses in the client environment, the selected individual data includes no apparatus identification information.

Consequently, the apparatus identification information about the information processing apparatuses is not able to be identified, and some of setting items of the individual data dependent on the apparatus identification information is not able to be reflected. Such setting items need to be manually set by the operator, which has hindered efficient setup operations.

SUMMARY OF THE INVENTION

The present invention is directed to a mechanism that can efficiently and reliably reflect individual data on an information processing apparatus even if the information processing apparatus is not associated with the individual data in advance.

According to an aspect of the present invention, a management apparatus configured to communicate with a plurality of information processing apparatuses includes a generation unit configured to generate common data to be set into the information processing apparatuses in common and individual data to be individually set into any one of the information processing apparatuses, in such a manner that the common data and the individual data are associated with an installation location, identification information for identifying an information processing apparatus to be set being not finalized for the any one of the information processing apparatuses, a management unit configured to register and manage the generated common data and the generated individual data in a storage unit, a first reception unit configured to receive an acquisition request for data to be set from any one of the information processing apparatuses along with identification information for identifying an information processing apparatus, a reply unit configured to send back a list of individual data registered to the information processing apparatus from which the acquisition request is received, and a distribution unit configured to distribute individual data on which a setting location is finalized and the common data to the information processing apparatus from which the acquisition request is received, based on information for identifying any pieces of individual data notified from the information processing apparatus.

Further features of the present invention will become apparent from the following description of exemplary embodiments with reference to the attached drawings.

BRIEF DESCRIPTION OF THE DRAWINGS

FIG. 6 is a diagram illustrating a data file of common data and individual data.

FIGS. 7A, 7B, and 7C are diagrams illustrating an example of a software configuration of a multifunction peripheral.

FIGS. 8B, 8C, and 8D are diagrams each illustrating a screen example.

FIG. 9A is a diagram illustrating a table configuration managed by a setting information database, and FIGS. 9B, 9C, 9D and 9E are diagrams each illustrating a table configuration managed by a data storage database.

FIG. 10A is a diagram illustrating an example of an edit screen held by a user interface (UI) control unit of an editing software. FIG. 10B is a diagram illustrating an example of a setting change screen held by a setting management service of multifunction peripheral software.

FIGS. 11A, 11B, and 11C are diagrams each illustrating an example of management screen held by a UI control unit of the management software.

FIG. 12 is a flowchart illustrating a control method by the information processing system.

FIG. 15 is a flowchart illustrating a method for controlling the information processing apparatus.

FIG. 16A a flowchart illustrating a system setting processing method of the management apparatus.

FIG. 18A is a flowchart illustrating a system setting processing method of the management apparatus.

FIGS. 19A, and 19B are flowcharts each illustrating a system setting processing method of the management apparatus. FIG. 19C is a diagram illustrating a screen example.

FIG. 21 is a diagram illustrating an example of a data selection screen displayed on an operation unit.

FIG. 22 is a flowchart illustrating a method for controlling the information processing system.

DESCRIPTION OF THE EMBODIMENTS

A best mode for carrying out the present invention will be described with reference to the drawings.
<Description of System Configuration>

According to a first exemplary embodiment, an operator registers common data and individual data in a management apparatus 102 in a preinstallation environment 100 connected to a network, and then an operator reflects the data as initial settings on a plurality of information processing apparatuses 111 and 112, as typified by a multifunction peripheral, in a client environment 110.

The operator who registers the common data and the individual data in the management apparatus 102 and the operator who reflects the data on the information processing apparatuses 111 and 112 in the client environment 110 may be the same or different. According to the present exemplary embodiment, a set of a "setting item" and a "setting value" may be referred to as "setting information."

Figure 1:
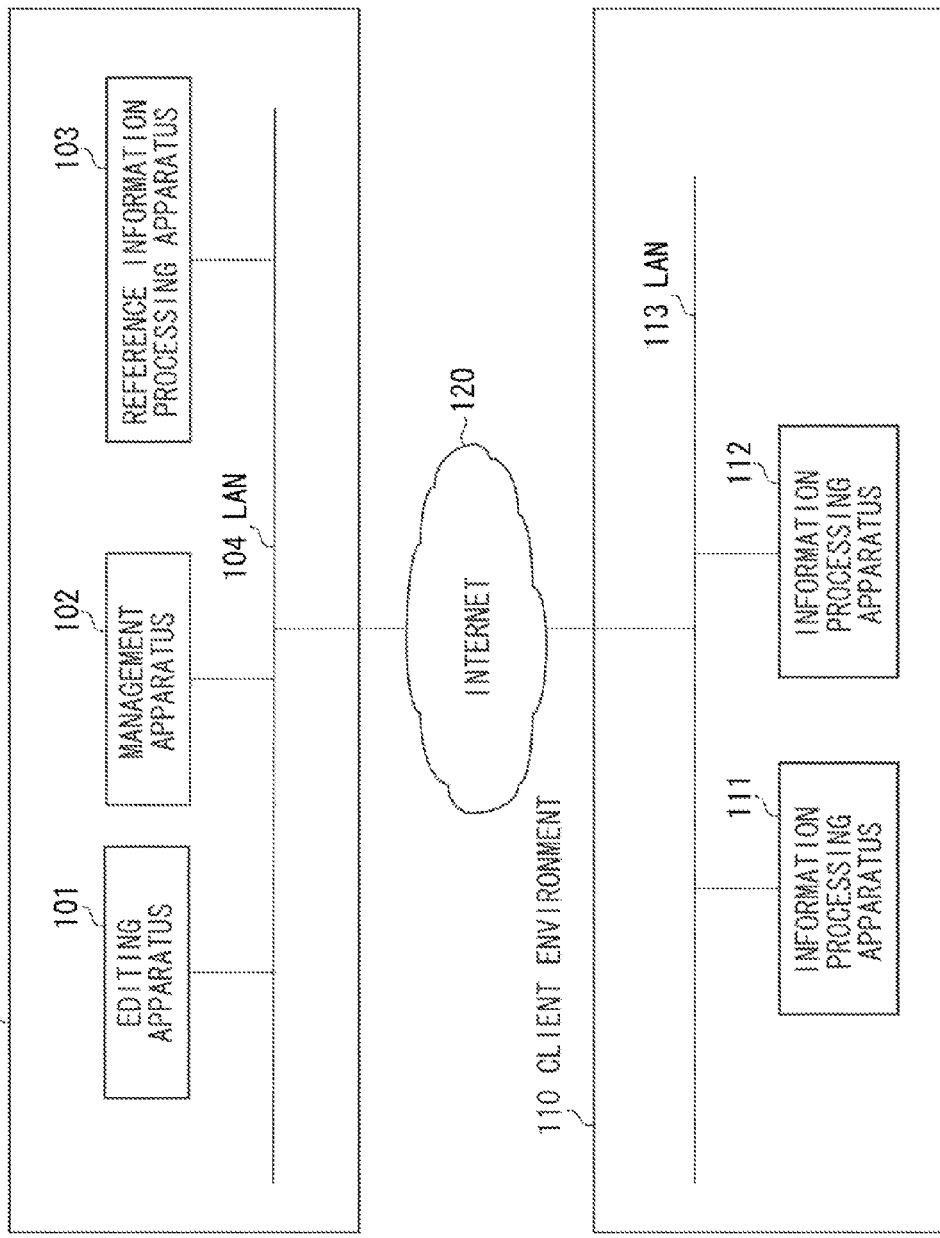
FIG. 1 is a diagram illustrating a configuration of an information processing system.

FIG. 1 is a diagram illustrating a configuration of an information processing system to which a management apparatus according to the present exemplary embodiment is applied.

In FIG. 1, the operator generates and manages the common data and individual data of the information processing apparatuses 111 and 112 in the preinstallation environment 100. The operator generates the common data and the individual data on an editing apparatus 101. The common data and the individual data generated by the editing apparatus 101 is registered and managed in the management apparatus 102. According to the present exemplary embodiment, the editing apparatus 101 and the management apparatus 102 are implemented by respective separate apparatuses. The editing apparatus 101 and the management apparatus 102 may be implemented within the same apparatus.

The operator tentatively applies the common data and the individual data to a reference information processing apparatus 103 to check whether setting information is reflected as desired by a client. The operator can modify the setting information on the reference information processing apparatus 103 if needed. The operator can take out the modified setting information from the reference information processing apparatus 103 as common data and individual data, and register the common data and the individual data in the management apparatus 102 again.

The editing apparatus 101, the management apparatus 102, and the reference information processing apparatus 103 are connected to a local area network (LAN) 104. The operator sets up information processing apparatuses 111 and 112 in the client environment 110. The information processing apparatuses 111 and 112 to be set up are all connected to a network by a LAN 113. The preinstallation environment 100 and the client environment 110 are connected to a network, as typified by the Internet 120.

Figure 2:
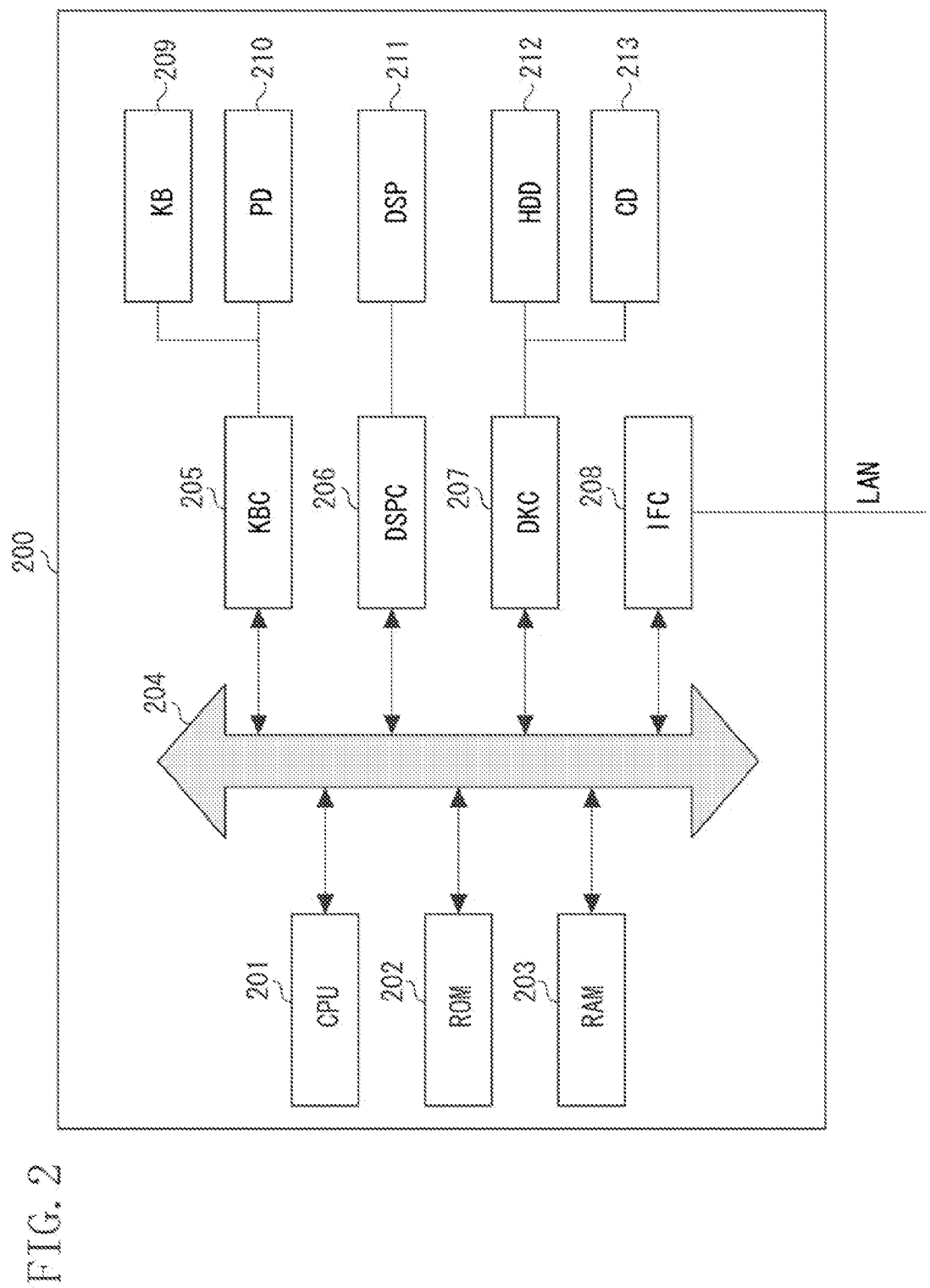
FIG. 2 is a block diagram illustrating a hardware configuration of an editing apparatus and a management apparatus.

FIG. 2 is a block diagram illustrating a hardware configuration of the editing apparatus 101 and the management apparatus 102 illustrated in FIG. 1. In the example illustrated in FIG. 2, the editing apparatus 101 and the management apparatus 102 are each constituted by a personal computer (PC) 200. A hard disk (hard disk drive (HDD)) 212 stores programs of editing software or management software according to the present exemplary embodiment. The editing software and the management software serve as operation agents in all the following description.

In FIG. 2, a central processing unit (CPU) 201 serves as a hardware execution agent in all the following description unless otherwise specified. The editing software or the management software stored in the HDD 212 serves as a software control agent.

A read-only memory (ROM) 202 stores a basic input/output system (BIOS) and a boot program. A random access memory (RAM) 203 functions as a main memory, a work area and the like of the CPU 201. A keyboard controller (KBC) 205 controls instruction inputs from a keyboard (KB) 209 and a pointing information processing device (PD) 210. A display controller (DSPC) 206 controls display of a display (DSP) 211.

A disk controller (DKC) 207 controls access to storage devices, such as the HDD 212 and a compact disc read-only memory (CD-ROM, or CD) 213. The HDD 212 and the CD 213 store a boot program, an operating system, a database, an information processing apparatus management program, and data thereof. An interface controller (IFC) 208 transmits and receives information to/from other network apparatuses via a LAN. Such components are arranged on a system bus 204. In the present exemplary embodiment, the operating system (OS) is assumed to be Windows (registered trademark) (manufactured by Microsoft Corporation). However, the OS is not limited thereto.

Editing programs and management programs according to the present exemplary embodiment may be stored and supplied in a storage medium, such as a CD-ROM. In such a case, the programs are read from the storage medium by the CD 213 illustrated in FIG. 2 and installed on the HDD 212.

Figure 3:
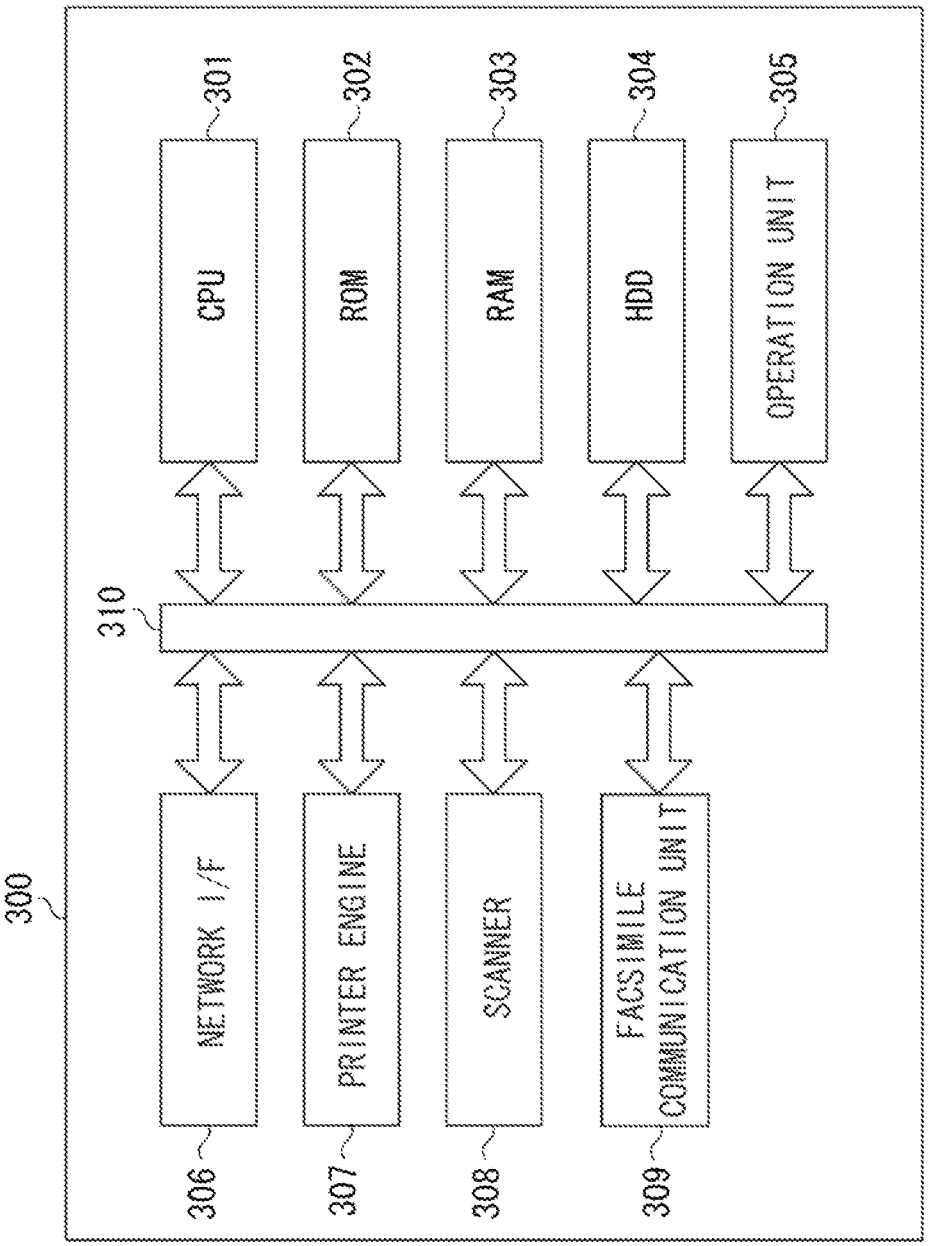
FIG. 3 is a block diagram illustrating a configuration of a reference information processing apparatus and an information processing apparatus.

FIG. 3 is a block diagram illustrating a configuration of the reference information processing apparatus 103 and the information processing apparatuses 111 and 112 illustrated in FIG. 1. In the present example, the reference information processing apparatus 103 and the information processing apparatuses 111 and 112 are assumed to be, for example, a multifunction peripheral 300 including a print function, a scan function, and a network communication function. An internal configuration of the multifunction peripheral 300 will be described below.

In FIG. 3, a CPU 301 controls the entire multifunction peripheral 300. A ROM 302 stores a print processing program to be executed by the CPU 301, font data, and apparatus identification information. A RAM 303 is used as a work area of the CPU 301, as a reception buffer, and for the purpose of drawing images. A HDD 304 records setting information about the multifunction peripheral 300.

An operation unit 305 includes various switches, buttons, and a liquid crystal display unit for displaying messages. The user can operate the setting information from the operation unit 305. A network interface (I/F) 306 is for connecting to a network. The network I/F 306 transmits and receives information to/from other network apparatuses via a LAN. A printer engine 307 performs printing on recording paper. A scanner 308 is for reading a document. A communication unit 309 is for performing facsimile transmission and reception.

Such components are arranged on a system bus 310.

Figure 4:
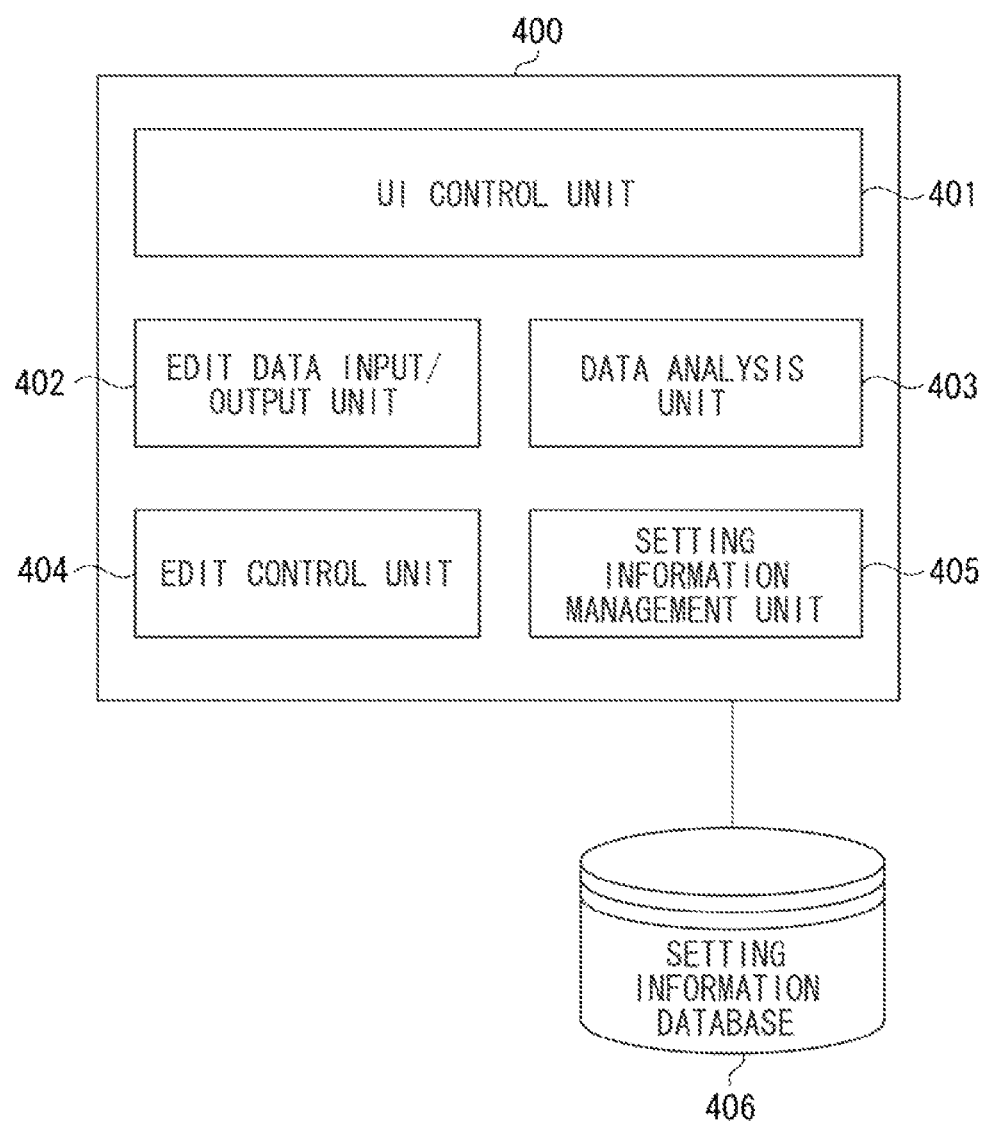
FIG. 4 is a diagram illustrating a configuration of editing software.

FIG. 4 is a diagram illustrating a configuration of editing software 400 running on the editing apparatus 101 illustrated in FIG. 1.

In FIG. 4, a user interface (UI) control unit 401 provides a graphical user interface which is used by the operator for operating the editing software 400. The graphical user interface is configured to be displayed on the DSP 211 included in the editing apparatus 101. The graphical user interface may be configured as a web application that can be used from other PCs by using the Hypertext Transfer Protocol (HTTP).

An edit data input/output unit 402 receives original data based on which the setting information is edited and outputs edited data via the UI control unit 401. The data to be input/output is common data or individual data.

A data analysis unit 403 analyzes and passes the original data to the UI control unit 401. The UI control unit 401 then displays the analyzed data in an editable state. If the operator generates new data, the data analysis unit 403 obtains initial values of the setting information from a setting information management unit 405 to be described below, and passes the initial values to the UI control unit 401. The data analysis unit 403 converts edited data into a predetermined format, and outputs the resultant via the edit data input/output unit 402.

After the operator edits the data displayed by the UI control unit 401, an edit control unit 404 verifies the editing result. Information for verifying the editing result is obtained from the setting information management unit 405. The setting information management unit 405 accesses a setting information database 406 to obtain information about settable setting items, setting values, and initial values thereof with respect to each model of an information processing apparatus.

The setting information database 406 is a database for managing the foregoing various types of information in a centralized manner.

Figure 5:
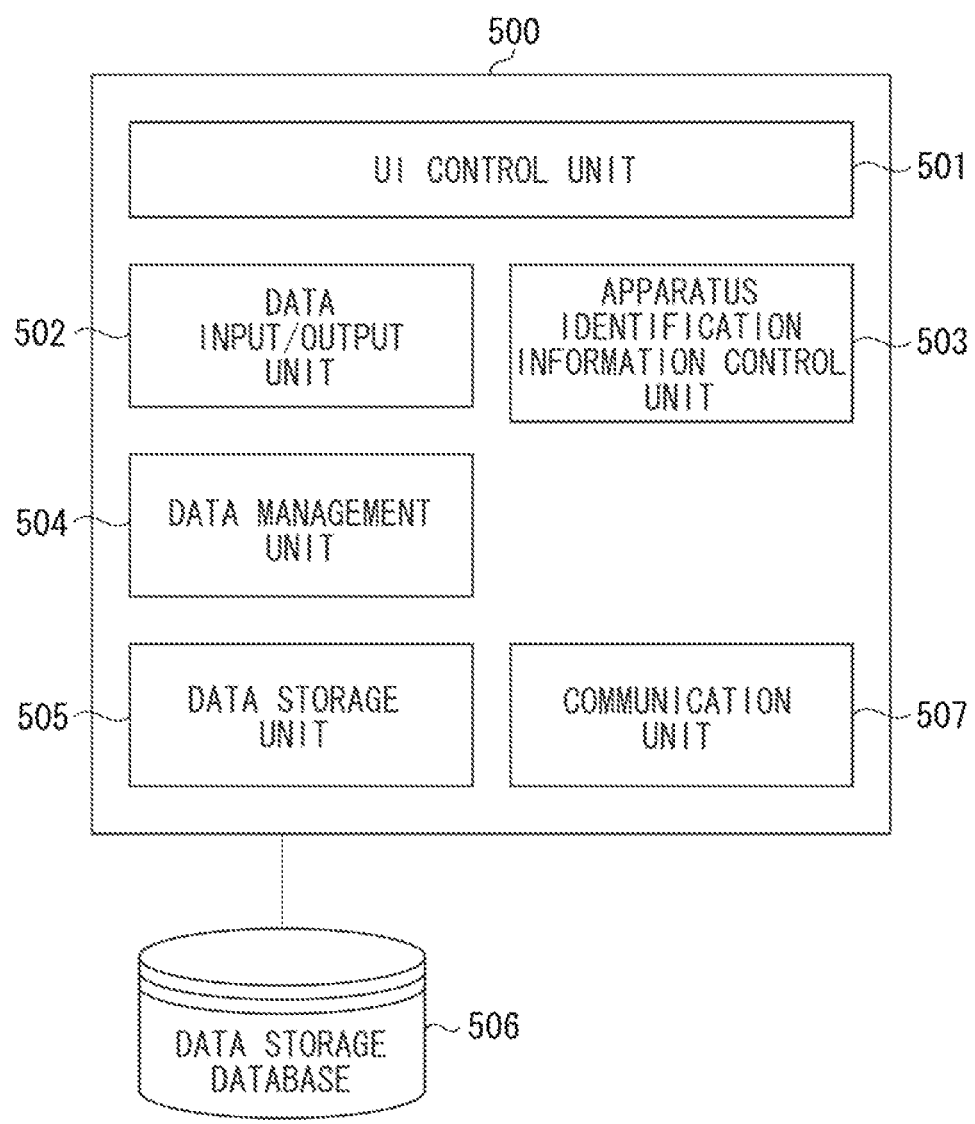
FIG. 5 is a diagram illustrating a configuration of management software.

FIG. 5 is a diagram illustrating a configuration of management software 500 running on the management apparatus 102 illustrated in FIG. 1.

In FIG. 5, a UI control unit 501 provides a graphical user interface which is used by the operator for operating the management software 500. The graphical user interface is configured to be displayed on the DSP 211 included in the management apparatus 102. The graphical user interface may be configured as a web application that can be used from other PCs by using HTTP.

A data input/output unit 502 receives common data and individual data edited by the editing apparatus 101 via the UI control unit 501. The data input/output unit 502 also outputs common data and individual data as original data to be read into the editing apparatus 101.

In the present exemplary embodiment, the data exchange between the editing apparatus 101 and the management apparatus 102 is assumed to be performed by the operator. However, the editing apparatus 101 may be configured to include a communication unit and directly perform data exchange via the LAN 104 and a communication unit 507. An apparatus identification information control unit 503 performs processing for linking the individual data received by the data input/output unit 502 with apparatus identification information about an information processing apparatus.

For example, in a case where a piece of individual data is the one to be applied to the information processing apparatus 111, the apparatus identification information control unit 503 embeds the apparatus identification information about the information processing apparatus 111 into the individual data to link the individual data with the information processing apparatus 111 (details will be described below). A data management unit 504 links and manages various types of data read into the management apparatus 102 with client information. The data management unit 504 also receives a data acquisition request from the information processing apparatus 111 and sends back corresponding data.

A data storage unit 505 stores the client information and various types of data managed by the data management unit 504 into a data storage database 506, and takes out various types of information and data according to a request from the data management unit 504.

The data storage database 506 is a database for managing the foregoing various types of information and data in a centralized manner. The communication unit 507 communicates with the reference information processing apparatus 103 and the information processing apparatuses 111 and 112 in the client environment 110 to transmit and receive various types of control information, common data, and individual data.

FIG. 6 is a diagram illustrating a data file of the common data and individual data described in the present exemplary embodiment.

In FIG. 6, a data file 600 of Extensible Markup Language (XML) format is an example of common data and individual data. In FIG. 6, an apparatus identification information description area 601 describes, for example, a model name (<Model> tag) and a serial number (<SerialNo> tag). A setting information description area 602 lists pieces of setting information (including installation location information) to be set in the information processing apparatus.

In FIG. 6, common data and individual data are not distinguished in terms of the format of the data file 600. Common data and individual data may be distinguished, for example, by providing a <DataType> tag in a <ControlData> tag.

In the present exemplary embodiment, the data file 600 is expressed in the XML format. However, the data file 600 may be expressed in a JavaScript Object Notation (JSON) format.

FIGS. 7A to 7C are diagrams illustrating an example of a software configuration of the multifunction peripheral 300 illustrated in FIG. 3.

FIG. 7A illustrates multifunction peripheral software 700 on the multifunction peripheral 300. A native program 701 of a control program originally provided for printer, facsimile (FAX), and scanner runs on an OS 710. An expansion program execution platform 702 also runs on the OS 710.

A firmware update service 703, an option activation service 704, and a setting management service 705 also run on the native program 701. An expansion program system service 706 and expansion programs 707 run on the expansion program execution platform 702.

The firmware update service 703 is a service that provides various functions for updating firmware. For example, the firmware update service 703 refers to firmware designated by the operator and determines whether the firmware needs to be updated. The firmware update service 703 updates firmware of or via the native program 701.

The option activation service 704 is a service for activating optional functions included in the native program 701 in advance. The option activation program 704 identifies and activates an optional function specified by an option license file designated by the operator.

The setting management service 705 is a service for managing various types of setting information about a printer and a scanner. The setting management service 705 includes a UI, and the operator can issue an instruction for a setting change via the operation unit 305 of the multifunction peripheral 300.

The setting management service 705 provides a function of rewriting setting information about the native program 701 if the operator designates a data file of the format described in FIG. 6. The setting management service 705 provides the setting information in the form of a data file in response to a request from the expansion programs 707. Requests from the expansion programs 707 to the setting management service 705 are performed via the expansion program system service 706.

The expansion program system service 706 is a utility library common between the expansion programs 707 and provided by the information processing system. The expansion programs 707 can call functions of the expansion program system service 706 to save time and effort for the development of the expansion programs 707.

An expansion program 707 can access the other expansion program 707 and the modules of the multifunction peripheral 300, such as the RAM 303, only through the expansion program execution platform 702 or the expansion program system service 706. In a case where an expansion program 707 includes a UI, the expansion program 707 can display an icon on a main menu screen displayed on the operation unit 305 of the multifunction peripheral 300. When the operator selects the icon, the operation unit 305 notifies the CPU 301 of the selection. The CPU 301 then displays the UI of the expansion program 707 selected by the operator on the operation unit 305.

The illustrated software configuration includes only basic parts. Other services may be included depending on the implemented environment. Due to setting limitations, unnecessary services may be omitted.

FIG. 7B is a diagram illustrating a configuration of the setting management service 705 illustrated in FIG. 7A in detail.

In FIG. 7B, a designation data analysis unit 721 analyzes a data file received by the setting management service 705. Specifically, the designation data analysis unit 721 extracts and temporarily stores apparatus identification information and setting information included in the data file into the RAM 303 or the HDD 304.

A reflection policy determination unit 722 determines whether each piece of setting information in the data file can be reflected on the multifunction peripheral 300 by using the apparatus identification information extracted from the data file by the designation data analysis unit 721 and the apparatus identification information about the multifunction peripheral 300 itself which is obtainable via the native program 701.

A reflection policy database 723 manages a reflection policy table 730 illustrated in FIG. 7C.

FIG. 7C illustrates the reflection policy table 730 which includes at least a setting item identifier (ID) 731, a setting item name 732, a type 733, a value range 734, an initial value 735, and a reflection condition 736. The reflection policy determination unit 722 determines whether to reflect each piece of setting information on the multifunction peripheral 300 according to the value of the reflection condition 736.

Figure 8A:
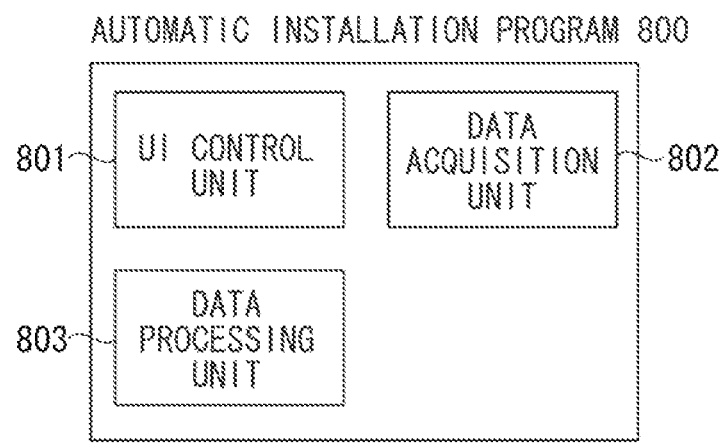
FIG. 8A is a diagram illustrating an example of a software configuration of an automatic installation program.

FIG. 8A is a diagram illustrating an example of a software configuration of an automatic installation program which runs on the multifunction peripheral 300. In the present exemplary embodiment, an automatic installation program 800 is implemented as one of the expansion programs 707 of the multifunction peripheral 300. Functions are implemented by the CPU 301 in such a manner that the CPU 301 executes programs according to the respective functions.

In FIG. 8A, the automatic installation program 800 includes a UI control unit 801, a data acquisition unit 802, and a data processing unit 803. The UI control unit 801 provides a UI for operating the automatic installation program 800 to the operator via the operation unit 305, and accepts the operator's operations. The data acquisition unit 802 obtains common data or individual data to be applied to the multifunction peripheral 300 from the management apparatus 102 via the expansion program system service 706 and the network I/F 306.

The data processing unit 803 performs processing for reflecting the data obtained by the data acquisition unit 802 on the multifunction peripheral 300 according to instructions from the UI control unit 801.

Figure 8B:
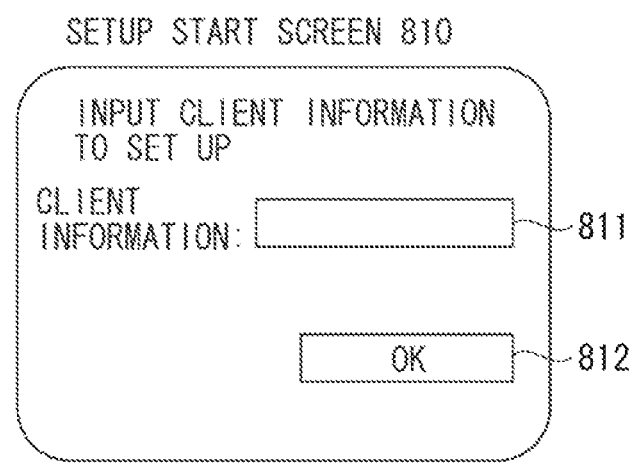

FIGS. 8B to 8D illustrate examples of screens of the automatic installation program 800, which will be described in detail in conjunction with flowcharts of the present exemplary embodiment to be described below.

FIGS. 9A to 9E are diagrams illustrating table configurations managed by the setting information database 406 illustrated in FIG. 4 and the data storage database 506 illustrated in FIG. 5. FIG. 9A illustrates an example of the table configuration managed by the setting information database 406. The table configuration of FIG. 9A is just an example. Table configurations different from that of the present exemplary embodiment may be used.

In FIG. 9A, a setting information management table 900 is used for when the editing apparatus 101 provides an editing function to the operator. The editing apparatus 101 needs to provide the same editing result as the one which is obtained by editing the setting items on the multifunction peripheral 300 by the operator.

The setting information management table 900 thus includes a setting item ID 901, a setting item name 902, a type 903, a value range 904, an initial value 905, and a reflection condition 906 which are the same as the setting item ID 731, the setting item name 732, the type 733, the value range 734, the initial value 735, and the reflection condition 736 of the reflection policy table 730.

FIGS. 9B to 9E illustrate an example of the table configuration managed by the data storage database 506. The table configuration of FIGS. 9B to 9E is just an example.

Table configurations different from that of the present exemplary embodiment may be used.

In FIGS. 9B to 9E, a client information management table 910 is a table for managing information about clients who perform setup operations. The information managed by the client information management table 910 includes a client ID 911, a client name 912, an installation state 913, and a comment 914.

The client ID 911 stores IDs that are uniquely assigned by the management apparatus 102 when the client information is registered in the management apparatus 102. The client name 912 stores names of the clients. The installation state 913 stores statuses of installation of the information processing apparatuses in the client environment 110. The comment 914 stores arbitrary character strings such as remarks.

An information processing apparatus management table 920 is a table for managing information about the information processing apparatuses set up in the client environment 110. The information managed by the information processing apparatus management table 920 includes apparatus identification information 921, a model name 922, and a client ID 923.

The apparatus identification information 921 stores apparatus identification information about information processing apparatuses. An example of the apparatus identification information is a serial number. Instead of serial numbers, other information that can uniquely identify the information processing apparatuses may be stored. The model name 922 stores model names of the information processing apparatuses.

The client ID 923 stores the IDs of clients who set up the information processing apparatuses designated by the apparatus identification information 921. The client ID 923 stores any of the values stored in the client ID 911 of the client information management table 910.

A common data management table 930 is a table for managing data to be reflected in common on the information processing apparatuses set up in the client environment 110. The information managed by the common data management table 930 includes a common data ID 931, a client ID 932, a common data name 933, and common data 934.

The common data ID 931 stores IDs that are uniquely assigned by the management apparatus 102 when data files generated by the editing apparatus 101 or the reference information processing apparatus 103 are registered in the management apparatus 102 as common data.

The client ID 932 stores the IDs of clients for whom the common data designated by the common data ID 931 is set up into the information processing apparatuses. The client ID 932 stores any of the values stored in the client ID 911 of the client information management table 910. The common data name 933 stores names of the common data. The common data 934 stores the common data itself registered in the management apparatus 120.

An individual data management table 940 is a table for managing individual data to be reflected on each individual information processing apparatus set up in the client environment 110. The information managed by the individual data management table 940 includes an individual data ID 941, a client ID 942, an individual data name 943, apparatus identification information 944, sub identification information 945, and individual data 946.

The individual data ID 941 stores IDs that are uniquely assigned by the management apparatus 102 when data files generated by the editing apparatus 101 or the reference information processing apparatus 103 are registered in the management apparatus 102 as individual data.

The client ID 942 stores the IDs of clients for whom the individual data designated by the individual data ID 941 is set up into the information processing apparatuses. The client ID 942 stores any of the values stored in the client ID 911 of the client information management table 910. The individual data name 943 stores names of the individual data.

The apparatus identification information 944 stores the apparatus identification information about the information processing apparatuses into which the individual data designated by the individual data ID 941 is set up. As described above, in the preinstallation environment 100, the individual data and the apparatus identification information are not always able to be associated with each other in advance. This column may thus be empty. A symbol (such as "unknown") indicating the unavailability of the association may be stored.

The sub identification information 945 stores information which is used by the operator for identifying the information processing apparatuses into which the individual data designated by the individual data ID 941 is set up. For example, the sub identification information 945 may store, though not limited to, an installation location or an information processing apparatus name. This column is a required input item if the apparatus identification information 944 is empty. The reason is that if both the columns are empty, there is no information for associating the individual data with the information processing apparatus.

The individual data 946 stores the individual data itself registered in the management apparatus 102.

FIGS. 10A and 10B are diagrams each illustrating an example of edit screen that is included in the UI control unit 401 of the editing software 400 illustrated in FIG. 4.

FIG. 10A illustrates an edit screen 1000, in which a name given to the data file of setting information generated on the present editing screen 1000 is input to a data name 1001.

The name of the model for which the data file generated on the present editing screen 1000 is targeted is input to a model name 1002. The value set in this area is stored into the data file as the value of the <Model> tag in the apparatus identification information description area 601.

Apparatus identification information about the information processing apparatus for which the data file generated on the present editing screen 1000 is targeted is input to apparatus identification information 1003. The value set in this area is stored into the data file as the value of the <SerialNo> tag in the apparatus identification information description area 601. Sleep transition time 1004, an IP address 1005, and an installation location 1006 are examples of setting items. Such setting items are generated by using the setting information management table 900.

When the operator presses an import button 1007 and specifies a data file, the editing software 400 takes in original data based on which the setting information is edited. The name of the imported data file may be displayed as an initial value of the data name 1001.

When the operator presses an export button 1008, the contents edited on the edit screen 1000 are converted into a data file of the format illustrated in FIG. 6 and exported. The data name input to the data name 1001 can be used as the name of the exported data file. However, this is not restrictive.

FIG. 10B illustrates an example of a setting change screen 1010 that is included in the setting management service 705 of the multifunction peripheral software 700. Since the setting change screen 1010 is a screen displayed on the multifunction peripheral 300, the model name and the apparatus identification information of the multifunction peripheral 300 itself are always used. The setting change screen 1010 therefore does not include items corresponding to the model name 1002 or the apparatus identification information 1003 of the edit screen 1000. The other items 1011 to 1016 are similar to the items 1001 and 1004 to 1008.

The setting items 1012 to 1014 are generated by using the reflection policy table 730. The import button 1015 is pressed to import a data file that rewrites the setting information about the native program 701 via the setting management service 705. The export button 1016 is pressed to export a data file. The values stored in the apparatus identification information description area 601 of the exported data file exported by pressing the export button 1016 are obtained from the native program 701.

Figure 11A:
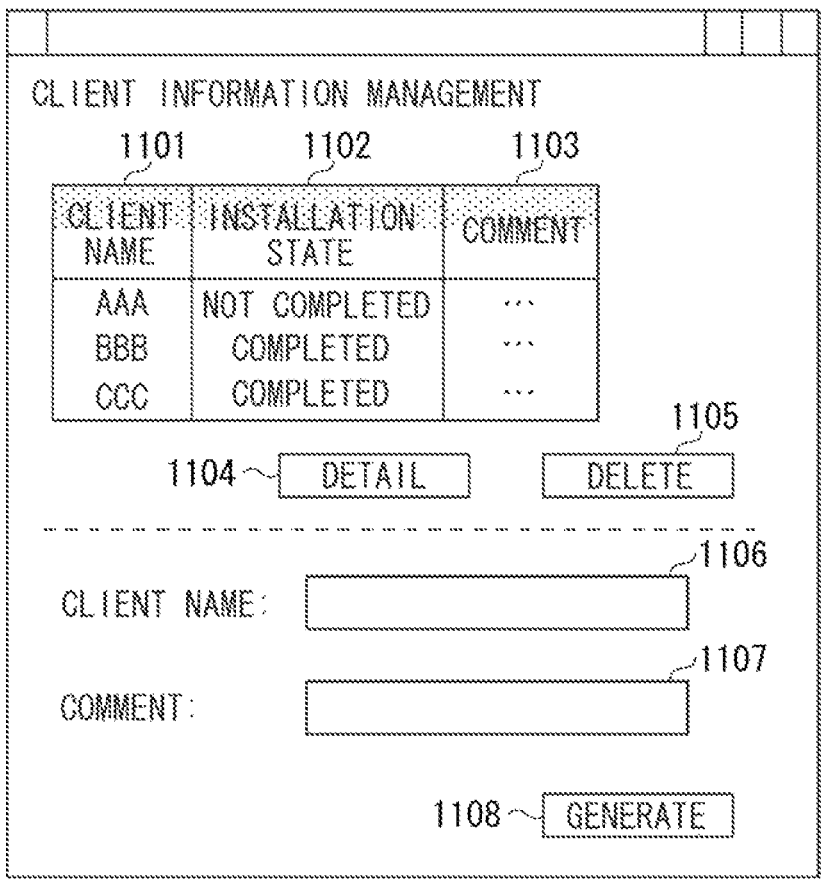
Figure 11C:
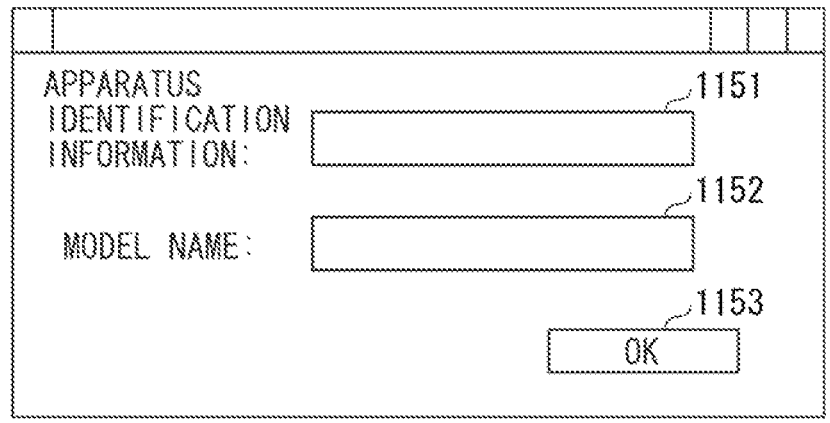

FIGS. 11A to 11C are diagrams each illustrating an example of management screen that is included in the UI control unit 501 of the management software 500 illustrated in FIG. 5.

FIG. 11A illustrates a client information management screen 1100, in which a client name 1101, an installation state 1102, and a comment 1103 display the values of the client name 912, the setting state 913, and the comment 914 of the client information management table 910, respectively.

When the operator selects an arbitrary row in a client information list (the list including the client name 1101 to the comment 1103) and presses a detail button 1104, a detail screen 1120 about the corresponding client is displayed. When the operator selects an arbitrary row in the client information list and presses a delete button 1105, the data on the corresponding row of the client information management table 930 is deleted.

When the operator inputs the name of a client and a comment into a client name 1106 and a comment 1107 and presses a generate button 1108, a new row is added to the client information management table 930. A unique client ID is generated by the data management unit 504 of the management software 500, and the values input by the operator are stored into the corresponding row. "Not completed" is stored in the installation state 913 as an initial value.

FIG. 11B illustrates the detail screen 1120, in which a client name 1121 displays the name of the client selected when the operator presses the detail button 1104.

Apparatus identification information 1122 and a model name 1123 display the values of the apparatus identification information 921 and the model name 922 of the information processing apparatus management table 920, respectively.

When the operator presses an add button 1124, an information processing apparatus information input screen 1150 is displayed.

When the operator selects an arbitrary row in an information processing apparatus list (the list including the apparatus identification information 1122 and the model name 1123) and presses a delete button 1125, the data on the corresponding row of the information processing apparatus management table 920 is deleted. A common data name 1126 displays the value corresponding to the client selected, when the operator presses the detail button 1104, among the values of the common data name 933 of the common data management table 930.

When the operator presses a detail button 1127, the setting items of the common data stored in the common data 934 of the common data management table 930 is displayed in a list. An operation when an import button 1128 is pressed will be described in detail with reference to the flowchart of FIG. 12.

When the operator presses an export button 1129, the data file of the designated common data is exported. When the operator presses a delete button 1130, the data on the corresponding row of the common data management table 930 is deleted.

An individual data name 1131, apparatus identification information 1132, and sub identification information 1133 display the values of the individual data name 943, the apparatus identification information 944, and the sub identification information 945 of the individual data management table 940, respectively.

When the operator presses a detail button 1134, the setting items of the individual data on the row associated with the row where the detail button 1134 is arranged among the pieces of individual data stored in the individual data 946 of the individual data management table 940 is displayed in a list. An operation when an import button 1135 is pressed will be described in detail with reference to the flowchart of FIG. 12.

When the operator selects an arbitrary row in an individual data list (the list including the individual data name 1131, the apparatus identification information 1132, and the sub identification information 1133) and presses an export button 1136, the data file of the designated individual data is exported.

When the operator selects an arbitrary row in the individual data list and presses a delete button 1137, the data on the corresponding row of the individual data management table 940 is deleted.

FIG. 11C illustrates the information processing apparatus information input screen 1150, which includes an area 1151 for inputting apparatus identification information and an area 1152 for inputting a model name. When the operator inputs apparatus identification information and a model name into the areas 1151 and 1152 and presses an OK button 1153, a new row is added to the information processing apparatus management table 920. The input values are stored into the corresponding row in association with the value of the client ID 911.

To reflect a data file of setting information generated by the editing apparatus 101 or the reference information processing apparatus 103 on the information processing apparatus 111, the management apparatus 102 and the information processing apparatus 111 perform the flowchart of FIG. 12. Similar effects can be obtained by applying the flowchart to the information processing apparatus 112 instead of the information processing apparatus 111.

FIG. 12 is a flowchart illustrating a system setting control method of the information processing system according to the present exemplary embodiment. The flowchart corresponds to a main flow of an example of system setting processing by the management apparatus 102 and the information processing apparatus 111 illustrated in FIG. 1. The steps are implemented by the CPU 201 of the management apparatus 102 and the CPU 301 of the information processing apparatus 111 executing stored control programs.

The present flowchart illustrates processing in a case where the operator is not able to associate the individual data generated by the editing apparatus 101 or the reference information processing apparatus 103 with apparatus identification information in advance. In the following description, the modules illustrated in FIG. 5 are described as agents.

In step S1201, a data file generated by the editing apparatus 101 or the reference information processing apparatus 103 is registered in the management apparatus 102.

Figure 13:
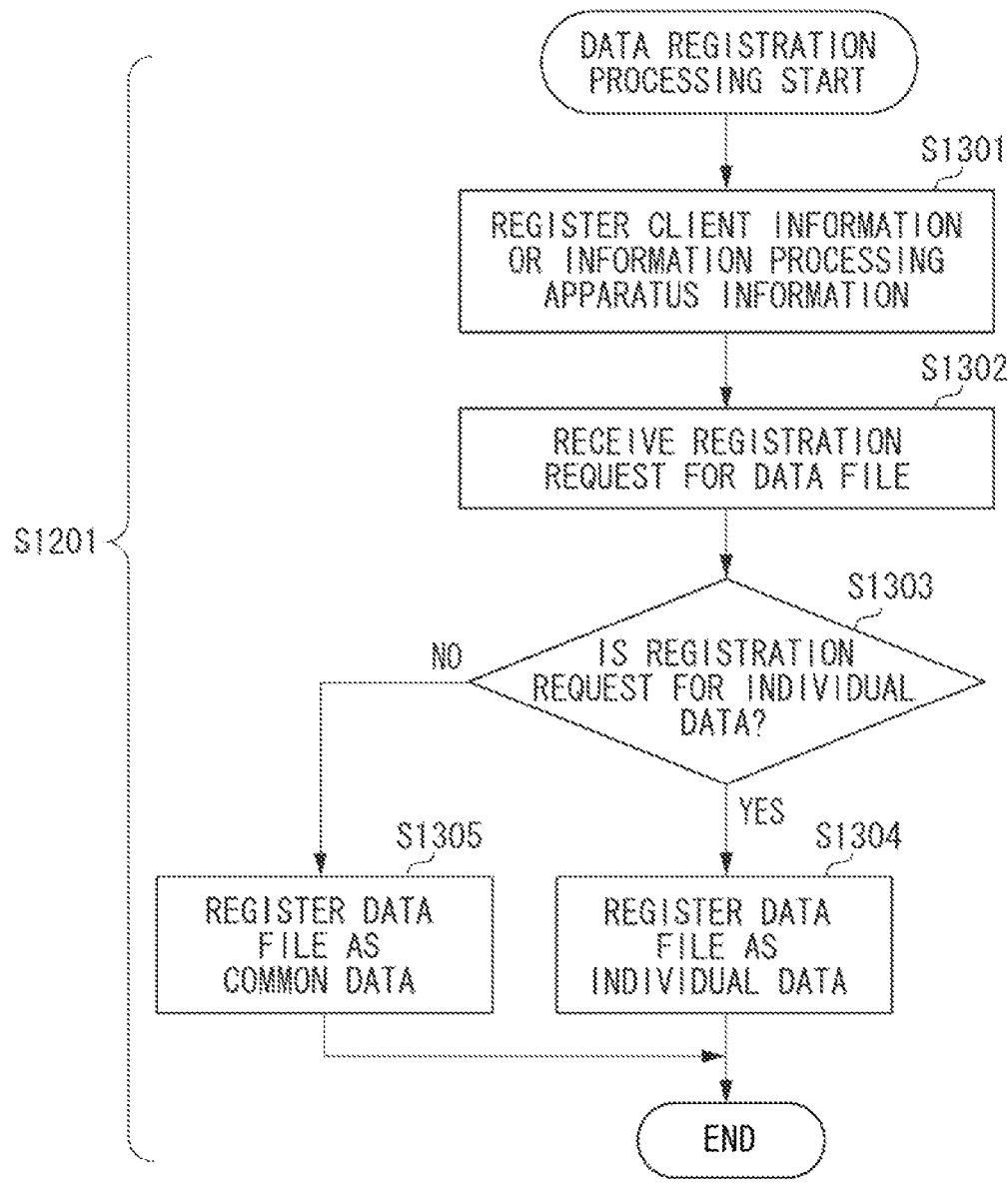
FIG. 13 is a flowchart illustrating a control method by the management apparatus.

FIG. 13 is a flowchart for illustrating a system setting control method by the management apparatus 102 according to the present exemplary embodiment. The flowchart is a detailed procedure example of the data registration processing of step S1201 by the management apparatus 102 illustrated in FIG. 12. The steps are implemented by the CPU 201 executing a stored control program. In the following description, the modules illustrated in FIG. 5 are described as agents.

In step S1301, the data input/output unit 502 registers client information or information processing apparatus information received via the UI control unit 501 into the data storage unit 505. The data storage unit 505 then registers the client information or the information processing apparatus information into the data storage database 506. Specifically, when the operator inputs the name of a client and a comment into the client name 1106 and the comment 1107 of the client information management screen 1100 and presses the generate button 1108, new client information is registered into the client information management table 910 illustrated in FIG. 9B. When the operator operates the information processing apparatus information input screen 1150 to register information about the information processing apparatus 111 to be set up in the client environment 110, the information processing apparatus information is registered into the information processing apparatus management table 920.

In step S1302, the data input/output unit 502 receives a registration request for a data file via the UI control unit 501. The registration request is issued by the operator pressing the import button 1128 or the import button 1135 of the detail screen 1120.

In step S1303, the data input/output unit 502 determines whether the registration request received in step S1302 is for individual data. For example, in a case where the import button 1128 is pressed, the registration request can be determined to be for common data. In a case where the import button 1135 is pressed, the registration request can be determined to be for individual data. Alternatively, the operator may issue an additional instruction about whether the registration request is for individual data or common data after pressing an import button.

In a case where the registration request is determined to be for individual data (YES in step S1303), the processing proceeds to step S1304. In a case where the registration request is determined to be not for individual data (NO in step S1303), the processing proceeds to step S1305.

In step S1304, the data input/output unit 502 receives and registers the data file into the individual data management table 940 as individual data via the data storage unit 505.

In step S1305, the data input/output unit 502 receives and registers the data file into the common data management table 930 as common data via the data storage unit 505. The description now returns to the steps illustrated in FIG. 12.

In step S1202, the data processing unit 803 of the automatic installation program 800 on the information processing apparatus 111 receives a setup start request from the operator via the UI control unit 801. In step S1203, to finalize the data file to be reflected on the information processing apparatus 111, the management apparatus 102 and the information processing apparatus 111 perform data finalization processing in a cooperative manner.

Figure 14:
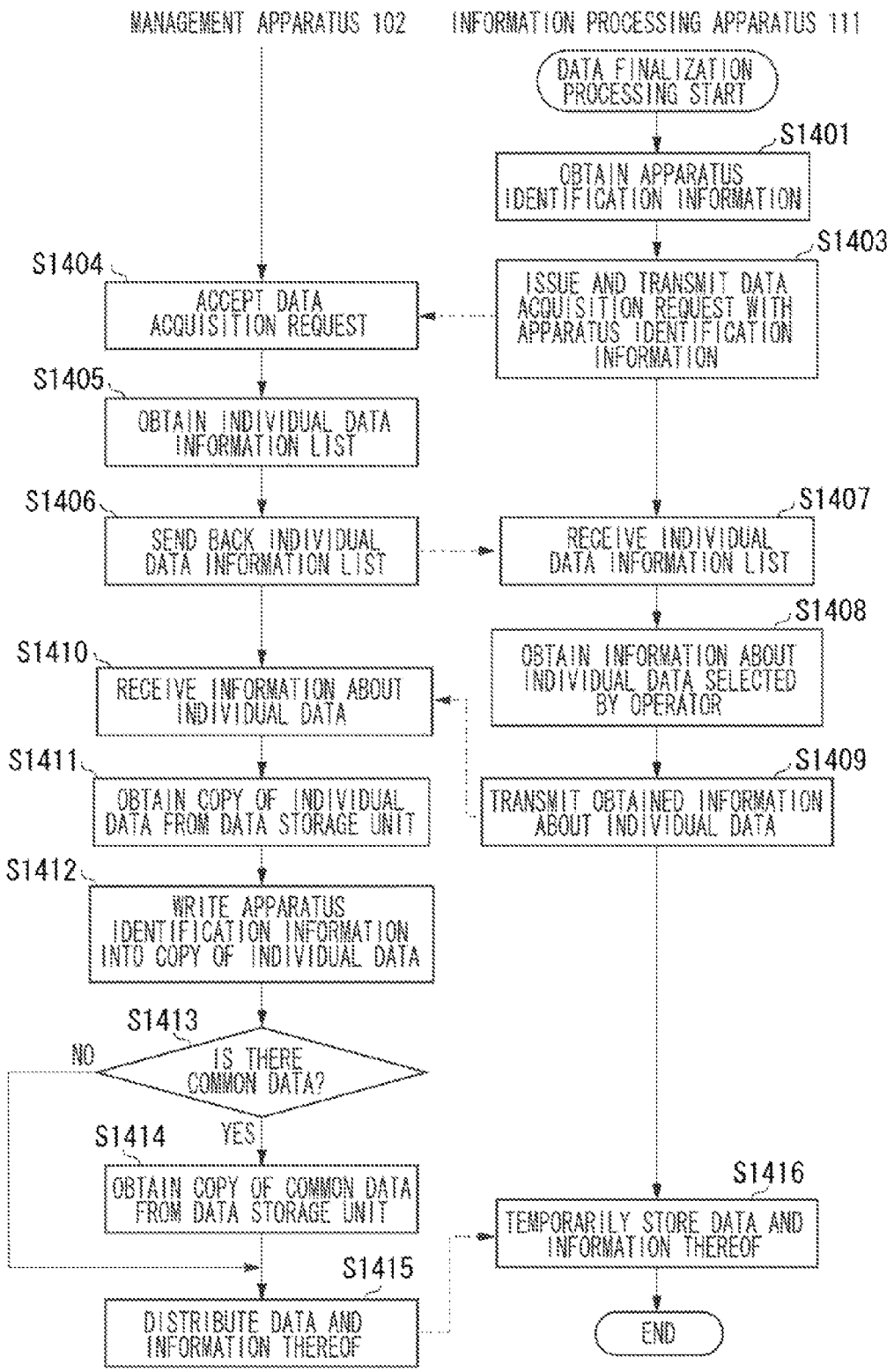
FIG. 14 is a flowchart illustrating a method for controlling the information processing system.

FIG. 14 is a flowchart for describing a method for controlling the information processing system according to the present exemplary embodiment. The flowchart is an example of the data finalization processing of step S1203 by the management apparatus 102 and the information processing apparatus 111. The steps are implemented by the CPU 301 of the information processing apparatus 111 and the CPU 201 of the management apparatus 102 executing stored control programs.

In step S1401, the data acquisition unit 802 of the automatic installation program 800 obtains the apparatus identification information stored in the ROM 302 via the expansion program system service 706. A typical example of the apparatus identification information is a serial number. The apparatus identification information is not limited thereto as long as the information processing apparatus 111 can be uniquely identified.

In step S1403, the UI control unit 801 displays a setup start screen 810 illustrated in FIG. 8B, thereby prompting the operator to input client information. Client information 811 may be any information that can identify the client like the client name 921 of the client information management table 910. For example, in a case where the management apparatus 102 is configured to perform access control with respect to each piece of client information to be managed so that the security is improved, the client information 811 may be authentication information for accessing information about the client.

When the operator inputs the client information into the client information 811 and presses an OK button 812, the data acquisition unit 802 issues a data acquisition request to the management apparatus 102. In the process, the data acquisition unit 802 transmits the apparatus identification information obtained in step S1401 in addition to the data acquisition request.

In step S1404, the data management unit 504 accepts the data acquisition request via the communication unit 507. The various types of information received are temporarily stored in the RAM 303 or the HDD 304.

In step S1405, the data management unit 504 obtains information about individual data related to the client information and the apparatus identification information included in the data acquisition request from the data storage unit 505. Specifically, the data management unit 504 identifies the value of the client ID 911 of the setup target by using the client information management table 910. The data management unit 504 then extracts information about the corresponding individual data (individual data information list) from the individual data management table 940 by using the value and the apparatus identification information. If there is no matching client ID, the number of pieces of information extracted is zero. If there is no matching apparatus identification information, the data management unit 504 extracts information about all pieces of individual data of which the client ID 942 matches and the apparatus identification information 944 is empty.

For example, suppose that a customer name "AAA" is input to the customer information 811 and the apparatus identification information about the information processing apparatus 111 is "A001." There is a matching client ID, which is "1." There is no matching application identification information. As a result, three pieces of individual data with "name d1," "name d2," and "name d3" in the individual data name 943 are extracted.

In step S1406, the data management unit 504 sends back the individual data information list extracted in step S1405 to the information processing apparatus 111. In step S1407, the data acquisition unit 802 receives the individual data information list, and displays an individual data selection screen 820 illustrated in FIG. 8C on the operation unit 305 via the UI control unit 801. The operator checks the values of an individual data name 822 and sub identification information 823 of the individual data selection screen 820, and operates a radio button 821 to select the individual data to be reflected on the information processing apparatus 111.

When the operator presses an OK button 824 of the individual data selection screen 820, then in step S1408, the data acquisition unit 802 obtains the information about the individual data selected by the operator on the individual data selection screen 820. The data acquisition unit 802 transmits the obtained information about the individual data to the management apparatus 102. In step S1410, the data management unit 504 receives the information about the individual data. In step S1411, the data management unit 504 obtains a copy of the corresponding individual data from the data storage unit 505. The copy of the individual data is temporarily stored in the RAM 203 or the HDD 212. In step S1412, the apparatus identification information control unit 503 writes the apparatus identification information received in step S1404 into the <SerialNo> tag in the apparatus identification information description area 601 of the copy of the individual data. The setting location of the individual data is thereby finalized.

In step S1413, the data management unit 504 determines whether there is common data to be set up in the client environment 110. Specifically, the data management unit 504 determines whether there is the value of the client ID identified in step S1405 in the common data management table 930.

In a case where the data management unit 504 determines that there is common data (YES in step S1413), the processing proceeds to step S1414. In a case where the data management unit 504 determines that there is no common data (NO in step S1413), the processing proceeds to step S1415.

In step S1414, the data management unit 504 obtains a copy of the common data from the data storage unit 505. In the present exemplary embodiment, the value of the client ID is "1." The data management unit 504 thus obtains a copy of the common data in which the value of the data ID 931 is "C001."

In step S1415, the data management unit 504 distributes the individual data into which the apparatus identification information is written in the foregoing step S1412 and the information thereof to the information processing apparatus 111. In a case where the process in step S1414 has been performed, the data management unit 504 also distributes the common data and the information thereof. In step S1416, the data acquisition unit 802 temporarily stores the individual data, the information thereof, the common data, and the information thereof into the RAM 303 or the HDD 304. The description now returns to the processing illustrated in FIG. 12.

In step S1204, to reflect the individual data and the common data finalized in the foregoing step S1203 on the information processing apparatus 111, the information processing apparatus 111 performs data reflection processing.

FIG. 15 is a flowchart for describing a method for controlling the information processing apparatus 111 according to the present exemplary embodiment. The flowchart corresponds to a detailed procedure of the processing of step S1204 illustrated in FIG. 12. The steps are implemented by the CPU 301 of the information processing apparatus 111 executing a control program. In the following description, the modules illustrated in FIG. 8A are described as agents.

In step S1501, the data processing unit 803 initializes a reflection result list for storing data reflection results. The reflection result list is temporarily generated on the RAM 303 or the HDD 304, and can store the result of reflection of both the individual data and common data. In step S1502, the data processing unit 803 performs display control to display a data confirmation screen 830 illustrated in FIG. 8D via the UI control unit 801.

A data type 831 of the data confirmation screen 830 displays the type of data, "common data" or "individual data." In FIG. 8D, a data name 832 displays the name of the data to be reflected. Sub identification information 833 displays the value of the sub identification information received in step S1416, if any. When the operator presses an OK button 834, the reflection of the data is approved.

In step S1503, the data processing unit 803 determines whether the reflection of the data displayed in the foregoing step S1502 is approved by the operator. In a case where the data processing apparatus 803 determines that the reflection is approved (YES in step S1503), the processing proceeds to step S1504. In a case where the data processing apparatus 803 determines that the reflection is not approved (NO in step S1503), the processing proceeds to step S1515.

In step S1504, the data processing unit 803 determines whether common data is received by the data acquisition unit 802 in the foregoing step S1416. In a case where the data processing unit 803 determines that common data is received (YES in step S1504), the processing proceeds to step S1507. In a case where the data processing unit 803 determines that common data is not received (NO in step S1504), the processing proceeds to step S1512.

In step S1507, the data processing unit 803 passes the common data stored in the foregoing step S1416 to the setting management service 705 via the expansion program system service 706. The designation data analysis unit 721 of the setting management service 705 then extracts setting information that can be reflected in cooperation with the reflection policy determination unit 722, and rewrites the setting information about the native program 701. Then, the setting management service 705 notifies the data processing unit 803 of the rewriting result. In step S1509, the data processing unit 803 writes the result of the reflection processing into the reflection result list.

In the foregoing step S1412, the apparatus identification information about the information processing apparatus 111 is written into the apparatus identification information description area 601 of the individual data. In step S1512, all the setting information included in the individual data is therefore reflected on the native program 701 in a case where the conditions described in the reflection condition 736 of the reflection policy table 703 are applied. In step S1514, the data processing unit 803 writes the result of the reflection processing into the reflection result list.

In step S1515, the data processing unit 803 writes into the reflection result list that the reflection is failed. In step S1516, the data processing unit 803 transmits the reflection result list to the management apparatus 102. The description now returns to the processing illustrated in FIG. 12.

In step S1205, the data management unit 504 receives the reflection result list as the result of the data reflection processing in the foregoing step S1204. The data management unit 504 temporarily stores the reflection result list into the RAM 203 or the HDD 212. In step S1206, the data management unit 504 analyzes the reflection result list to determine whether the data reflection processing is successful. In a case where the data reflection processing is determined to be successful (YES in step S1206), the processing proceeds to step S1207. In a case where the data reflection processing is determined to be not successful (NO in step S1206), the processing proceeds to step S1208.

In step S1207, the data management unit 504 changes the value of the apparatus identification information 944 of the individual data management table 940 to the apparatus identification information of the individual data sent back in the foregoing step S1415. The data management unit 504 also embeds the apparatus identification information into the <SerialNo> tag in the apparatus identification information description area 601 of the individual data stored in the individual data 946.

With the processing described above, it becomes possible to reduce the number of pieces of individual data extracted in the foregoing step S1405 when the operator continues setup operations of other information processing apparatuses (for example, the information processing apparatus 112).

In step S1208, the data management unit 504 determines whether all the information processing apparatuses in the client environment 110 have been set up. In a case where setup for all the information processing apparatuses is determined to have been performed (YES in step S1208), the processing proceeds to step S1209. In a case where setup for all the information processing apparatuses is determined to have been not performed (NO in step S1208), the present processing ends.

In step S1209, the data management unit 504 rewrites the value of the installation state 913 of the client information management table 910 to "completed."

According to a second exemplary embodiment, the apparatus identification information description area 601 of the individual data is associated with the apparatus identification information in the data registration processing of step S1201 but not in the data finalization processing of step S1203 like the first exemplary embodiment.

Since the processing of step S1201 is performed in the preinstallation environment 100 and the processing of step S1203 is performed in the client environment 110, the setup operations in the client environment 110 become more efficient by establishing the association in step S1201.

The second exemplary embodiment can be implemented by a flowchart similar to that of FIG. 12 according to the first exemplary embodiment, whereas there are differences in the data registration processing of step S1201 and the data finalization processing of step S1203. The following description is mainly for the differences from the first exemplary embodiment.

Figure 16B:
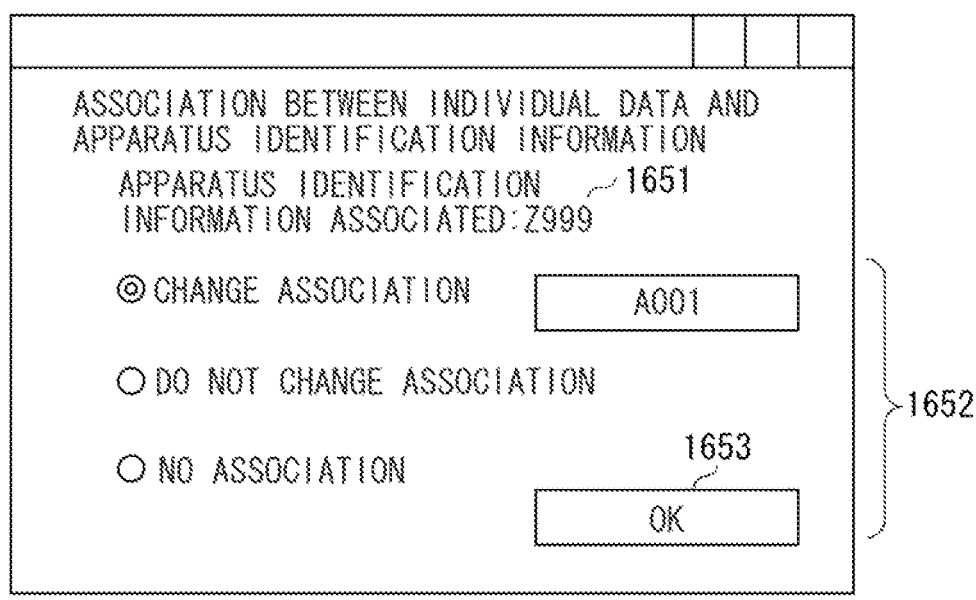
FIG. 16B is a diagram illustrating a screen example.

FIGS. 16A and 16B are diagrams illustrating a system setting processing method of the management apparatus 102 according to the present exemplary embodiment. FIG. 16A illustrates an example of a flowchart in which the data registration processing of step S1201 illustrated in FIG. 12 is applied to the present exemplary embodiment. Steps S1601 to S1603 are similar to steps S1301 to S1303 illustrated in FIG. 13. A description thereof will thus be omitted. The steps are implemented by the CPU 201 executing a stored control program. In the following description, the modules illustrated in FIG. 5 are described as agents.

In step S1604, the data input/output unit 502 displays an import confirmation screen 1650 illustrated in FIG. 16B via the UI control unit 501, thereby prompting the operator to select association of the apparatus identification information in the individual data.

In the import confirmation screen 1650 illustrated in FIG. 16B, intra-individual data apparatus identification information 1651 displays the apparatus identification information in the registration-requested individual data. In a case where the association between the individual data and the apparatus identification information about the information processing apparatus has been determined at the time of execution of the present flowchart in the preinstallation environment 100, the operator selects "change association" of an association change option 1652 and inputs the new apparatus identification information. In a case where the association does not need to be changed, the operator selects "do not change association" of the association change option 1652.

In a case where the association between the individual data and the apparatus identification information about the information processing apparatus has not been determined, the operator selects "no association" of the association change option 1652.

When the operator presses an OK button 1653, the processing proceeds to step S1605.

In step S1605, the data input/output unit 502 determines whether the apparatus identification information of the individual data is requested to be changed (change request) in the foregoing step S1604. Specifically, the data input/output unit 502 determines whether "change association" or "no association" of the association change option 1652 is selected by the operator. In a case where the data input/output unit 502 determines that the apparatus identification information of the individual data is requested to be changed (YES in step S1605), the processing proceeds to step S1606. In a case where the data input/output unit 502 determines that the apparatus identification information of the individual data is not requested to be changed (NO in step S1605), the processing proceeds to step S1607.

In step S1606, according to the operator's instruction given in step S1604, the apparatus identification information control unit 503 performs a write to replace the apparatus identification information in the <SerialNo> tag of the apparatus identification information description area 601 of the individual data with the apparatus identification information selected by the association change option 1652. In step S1607, the data input/out unit 502 registers the individual data in the individual data management table 940. In the process, the data input/output unit 502 writes the apparatus identification information used in step S1606 into the apparatus identification information 944. Step S1608 is similar to step S1305 according to the first exemplary embodiment. A description thereof will thus be omitted.

An example in which the data finalization processing of step S1203 in FIG. 12 is applied to the present exemplary embodiment will be described.

Figure 17:
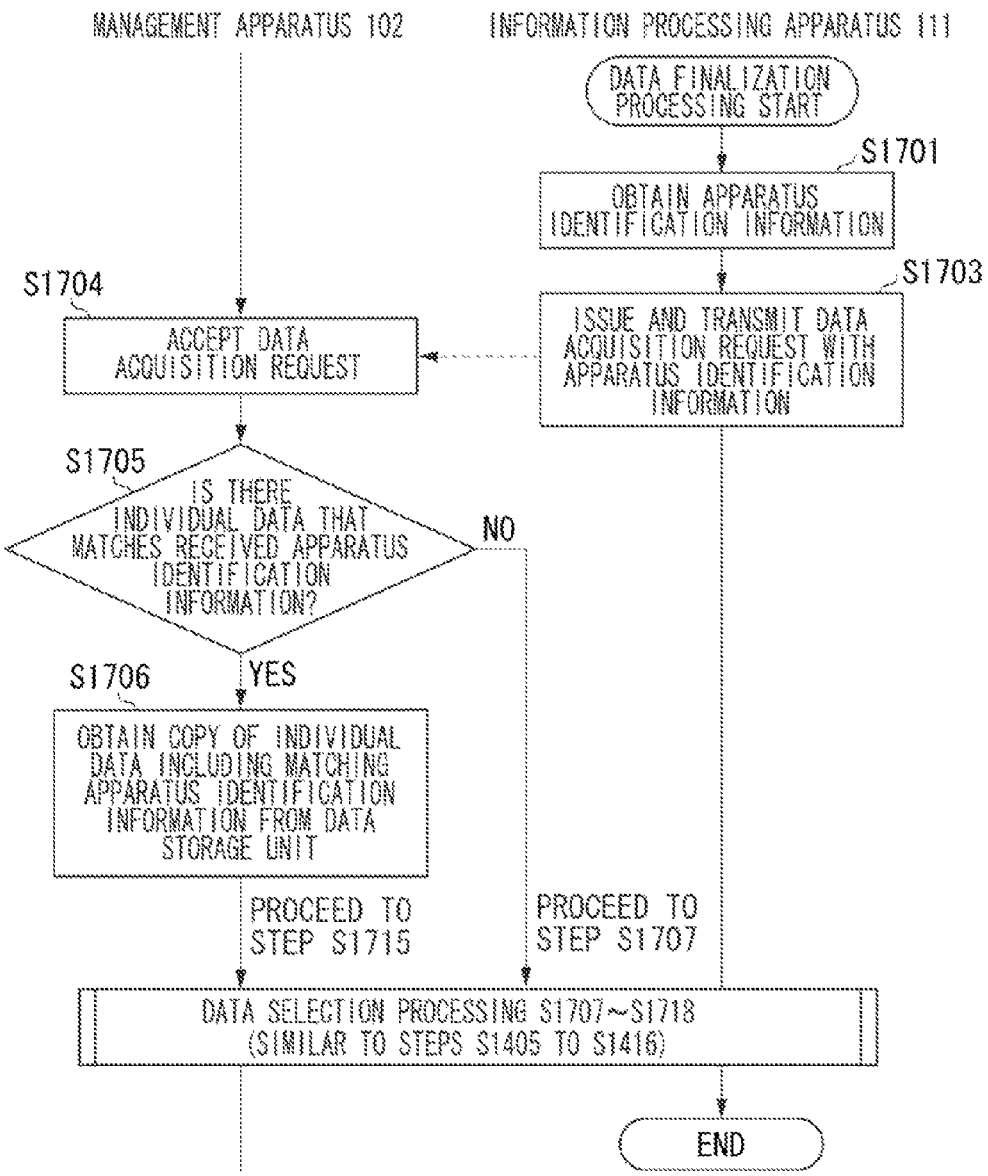
FIG. 17 is a flowchart illustrating a method for controlling the information processing system.

FIG. 17 is a flowchart illustrating the system setting processing method by the information processing system according to the present exemplary embodiment. In the flowchart, the processing of step S1203 is applied to the present exemplary embodiment. Steps S1701 to S1704 are similar to steps S1401 to S1404 according to the first exemplary embodiment. A description thereof will thus be omitted. The steps are implemented by the CPU 301 of the information processing apparatus 111 and the CPU 201 of the management apparatus 102 executing stored control programs.

In step S1705, the data management unit 504 determines whether there is individual data that matches the apparatus identification information included in the request received in step S1704 in the data storage database 506. Specifically, the data management unit 504 determines whether there is a match with the apparatus identification information in the apparatus identification information 944 and the individual data 946 of the individual data management table 940. In a case where the data management unit 504 determines that there is matching apparatus identification information (YES in step S1705), the processing proceeds to step S1706. In a case where the data management unit 504 determines that there is no matching apparatus identification information (NO in step S1705), the processing proceeds to step S1707.

In step S1706, the data management unit 504 obtains a copy of the corresponding individual data from the data storage unit 504. The processing then proceeds to step S1715 (similar to step S1413 according to the first exemplary embodiment). Steps S1707 to S1718 are data selection processing. The data selection processing is slimier to the processing of steps S1405 to S1416 according to the first exemplary embodiment. A description thereof will thus be omitted.

As described above, the rest of the flowchart illustrated in FIG. 12, other than step S1201 described in FIGS. 16A and 16B and step S1203 described in FIG. 17, is similar to that of the first exemplary embodiment. A description thereof will thus be omitted.

According to the second exemplary embodiment, the association between the individual data and the apparatus identification information is finalized in the preinstallation environment 100.

An information processing apparatus supposed to be set up in a certain location in the client environment 110 may sometimes be allocated to another location due to a sudden breakdown. In such a case, the association between the individual data and the apparatus identification information generated in the preinstallation environment 100 needs to be changed. According to the second exemplary embodiment, it is not possible to handle such a situation. According to a third exemplary embodiment, the association between the individual information and the apparatus identification information is changed in the client environment 110.

The third exemplary embodiment can also be implemented by a flowchart similar to that of FIG. 12. There are differences in the data finalization processing of step S1203 and the processing of step S1207. The following description is mainly for differences from the second exemplary embodiment.

Figure 18B:
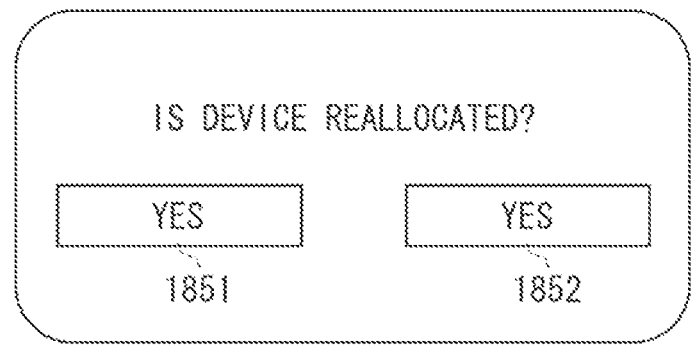
FIG. 18B is a diagram illustrating a screen example.

FIGS. 18A and 18B are diagrams for describing the system setting processing method of the management apparatus 102 according to the present exemplary embodiment. FIG. 18A illustrates an example of a flowchart in which the data finalization processing of step S1203 illustrated in FIG. 12 is applied to the present exemplary embodiment. The steps are implemented by the CPU 301 of the information processing apparatus 111 and the CPU 201 of the management apparatus 102 executing stored control programs.

In step S1801, the data acquisition unit 802 determines whether the information processing apparatus 111 is reallocated during setup in the client environment 110. Specifically, in a case where the operator presses a YES button 1851 on a reallocation confirmation screen 1850 of FIG. 18B displayed by the UI control unit 801, the data acquisition unit 802 determines that the information processing apparatus 111 is reallocated. In a case where the operator presses a NO button 1852, the data acquisition unit 802 determines that the information processing apparatus 111 is not reallocated. Reallocating the information processing apparatus 111 refers to a case such that the information processing apparatus 111 is set up in a location where the information processing apparatus 112 is supposed to be set up in the client environment 110.

In a case where the data acquisition unit 802 determines that the information processing apparatus 111 is reallocated (YES in step S1801), the processing proceeds to step S1802. In a case where the data acquisition unit 802 determines that the information processing apparatus 111 is not reallocated (NO in step S1802), the processing proceeds to step S1803. In step S1802, the data acquisition unit 802 sets the value of a reallocation flag temporarily provided in the RAM 303 or the HDD 304 to "TRUE."

In step S1803, the data acquisition unit 802 sets the value of the reallocation flag to "FALSE." Step S1804 is similar to step S1401 described in the first exemplary embodiment and step S1701 described in the second exemplary embodiment. A description thereof will thus be omitted.

Step S1806 is similar to step S1403 according to the first exemplary and step S1703 according to the second exemplary embodiment. A difference is in that the data acquisition unit 802 also transmits the reallocation flag set in step S1802 or S1803.

Step S1807 is similar to step S1404 according to the first exemplary embodiment and step S1704 according to the second exemplary embodiment. A description thereof will thus be omitted.

In step S1808, the data management unit 504 determines whether the value of the reallocation flag indicating whether setting data is to be used is "TRUE." In a case where the value of the reallocation flag is determined to be "TRUE" (YES in step S1808), the processing proceeds to step S1811. In a case where the value of the reallocation flag is determined to be not "TRUE" (NO in step S1808), the processing proceeds to step S1809.

Steps S1809 and S1810 are similar to steps S1705 and S1706 according to the second exemplary embodiment. A description thereof will thus be omitted. After step S1810, the processing proceeds to step S1819 (similar to step S1715 according to the second exemplary embodiment and step S1413 according the first exemplary embodiment). Steps S1811 to S1822 are data selection processing. The data selection processing is similar to the processing of step S1405 to S1416 according to the first exemplary embodiment and that of steps S1707 to S1718 according to the second exemplary embodiment. A description thereof will thus be omitted.

The processing of step S1207 according to the present exemplary embodiment will be described.

In the present exemplary embodiment, in step S1207, the data management unit 504 initially cancels the association between the apparatus identification information about the reallocated information processing apparatus 111 and the individual data on the individual data management table 940. Specifically, the data management unit 504 detects and deletes the same value in the apparatus identification information 944 of the individual data management table 940 as the apparatus identification information received in step S1807. The data management unit 504 further sets empty the value of the <SerialNo> tag in the apparatus identification information description area 601 of the individual data stored in the individual data 946. Such deletion processing is needed to prevent the same value from being stored into the apparatus identification information 944. The data management unit 504 then performs processing similar to that of step S1207 according to the first and second exemplary embodiments.

As described above, the steps other than step S1203 described in FIG. 18A and step S1207 are similar to those of the second exemplary embodiment. A description thereof will thus be omitted.

The foregoing first to third exemplary embodiments are described mainly for an operation when individual information is reflected. In a fourth exemplary embodiment, an operation when common data is reflected is described.

Like the first to third exemplary embodiments, the fourth exemplary embodiment can be implemented by the flowchart of FIG. 12, whereas there are differences in the data registration processing of step S1201 and the data finalization processing of step S1203. The following description is mainly for the differences from the first to third exemplary embodiments.

Figure 19A:
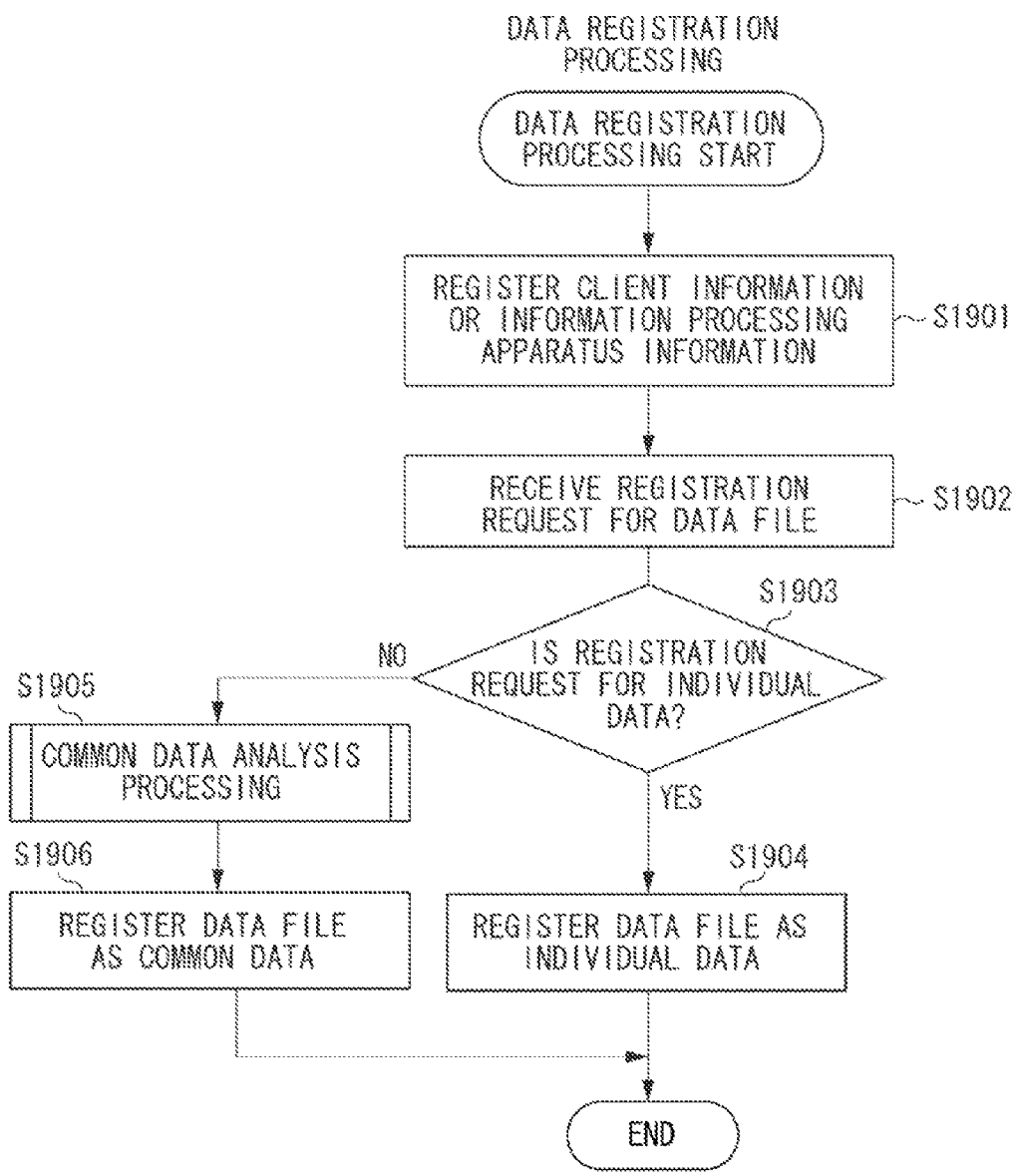

FIGS. 19A to 19C are diagrams for describing the system setting processing method of the management apparatus 102 according to the present exemplary embodiment. FIGS. 19A and 19B illustrate an example where the data registration processing of step S1201 is applied to the present exemplary embodiment. Processing according to the fourth exemplary embodiment is added to the processing of step S1201 illustrated in FIG. 12. Similar effects can be obtained by adding the processing according to the fourth exemplary embodiment to the processing of step S1201 according to the second or third exemplary embodiment. Steps S1901 to S1904 illustrated in FIG. 19A are similar to steps S1301 to S1304 described in the first exemplary embodiment. A description thereof will thus be omitted. The steps are implemented by the CPU 201 of the management apparatus 102 executing a stored control program. In the following description, the modules illustrated in FIG. 5 are described as agents.

In step S1905, the data input/output unit 502 performs common data analysis processing according to the procedure of the flowchart illustrated in FIG. 19B.

In step S1921, the data input/output unit 502 extracts setting information of which reflection on information processing apparatuses is limited and the setting value is different from an initial value from among the pieces of setting information of the registration-requested common data.

Specifically, the data input/output unit 502 extracts a piece or pieces of setting data of which the reflection condition 906 of the setting information management table 900 is set to other than "always reflect" and the setting value is different from the initial value 905 from among the pieces of setting information listed in the setting information description area 602 of the common data.

In step S1922, the data input/output unit 502 displays the setting information extracted in step S1921 in a list on a common data selection screen 1950 illustrated in FIG. 19C via the UI control unit 501.

In the common data selection screen 1950 illustrated in FIG. 19C, a setting item list 1951 displays the setting information extracted in step S1922.

In step S1923, the UI control unit 501 accepts an input to the common data selection screen 1950. When the operator presses an OK button 1952, the UI control unit 501 passes the selection result of the setting information to the data input/output unit 502. In step S1924, the data input/output unit 502 deletes setting information not selected in step S1923 from the common data. The description of the present exemplary embodiment now returns to the processing illustrated in FIG. 19A.

In step S1906, the data input/output unit 502 performs the common data registration processing of step S1305 according to the first exemplary embodiment. In addition to the process, in a case where not-selected setting information is deleted from the common data in step S1924, the data input/output unit 502 also registers a common data deletion flag indicating of the deletion.

Figure 20:
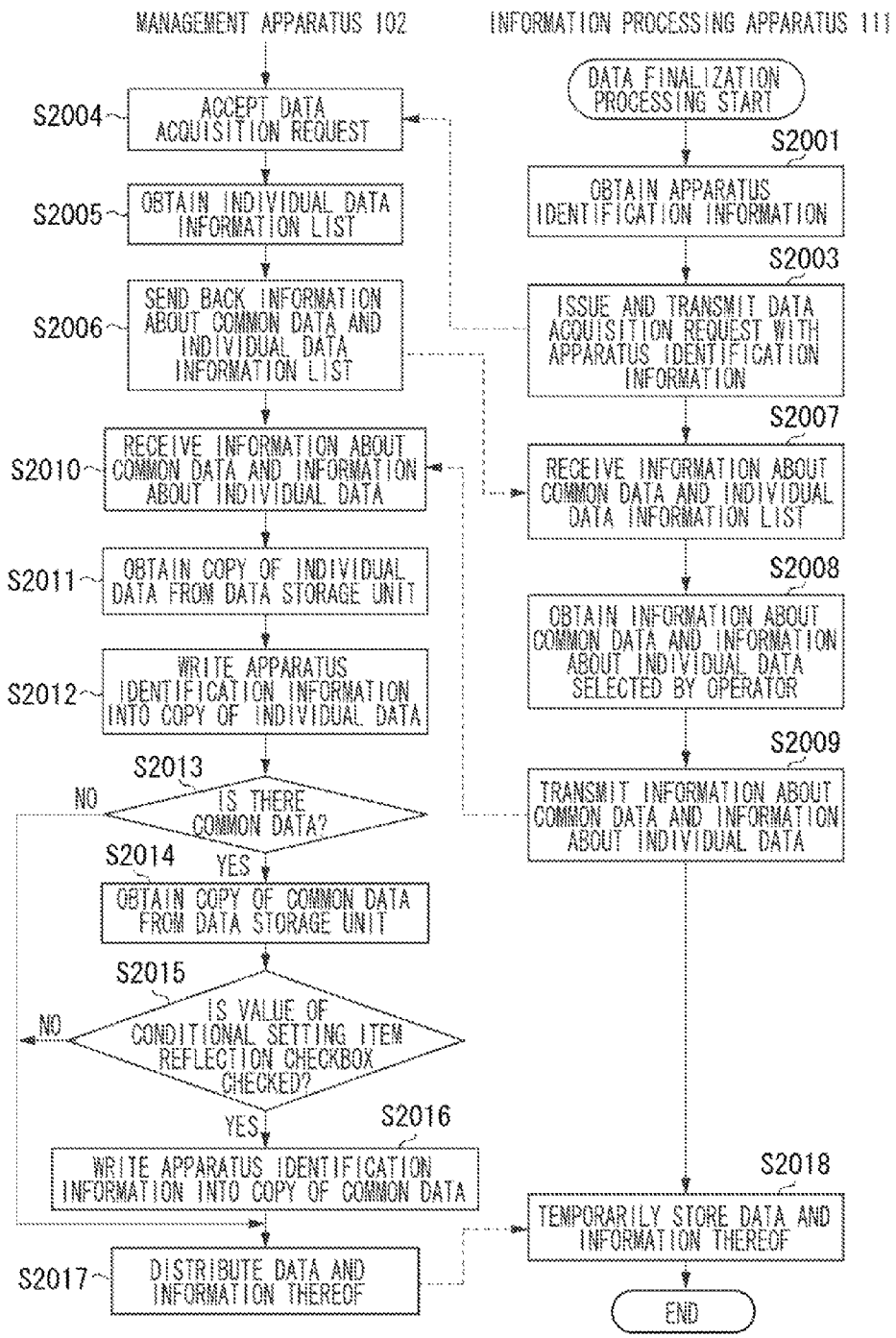
FIG. 20 is a flowchart illustrating a method for controlling the information processing system.

FIG. 20 is a flowchart for describing a system setting method of the information processing system according to the present exemplary embodiment. In the present example, the processing of step S1203 illustrated in FIG. 12 is applied to the present exemplary embodiment. The steps are implemented by the CPU 301 of the information processing apparatus 111 and the CPU 201 of the management apparatus 102 executing stored control programs.

Steps S2001 to S2005 are slimier to steps S1401 to S1405 according to the first exemplary embodiment. A description thereof will thus be omitted.

In step S2006, the data management unit 504 extracts information about common data corresponding to the client information to be set up from the common data management table 903, and sends back the information about the common data to the automatic installation program 800 along with the individual data information list. If there is no information about common data, the data management unit 504 sends back only the individual data information list.

In step S2007, the data acquisition unit 802 receives the individual data information list and the information about the common data, and displays a data selection screen 2100 illustrated in FIG. 21 on the operation unit 305 via the UI control unit 801. Radio buttons 2101, an individual data name 2102, and sub identification information 2103 of the data selection screen 2100 are similar to the radio buttons 821, the individual data name 822, and the sub identification information 823 of the individual data selection screen 820. A description thereof will thus be omitted.

In FIG. 21, a conditional setting item reflection checkbox 2104 is displayed in a case where the common data deletion flag is received in step S2007. In a case where the operator checks the conditional setting item reflection checkbox 2104, all the setting items in the common data are reflected on the information processing apparatus 111 in the data reflection processing of step S1204. In a case where the operator does not check the conditional setting item reflection checkbox 2104, the setting item(s) with a reflection condition will not be reflected.

When the operator presses an OK button 2105 on the data selection screen 2100, then in step S2008, the data acquisition unit 802 obtains the information about the individual data and the information about the common data selected by the operator on the data selection screen 2100. In step S2009, the data acquisition unit 802 transmits the information about the common data and the information about the individual data to the management apparatus 102.

In step S2010, the data management unit 504 receives the information about the individual data and the information about the common data. The data management unit 504 also receives the value of the conditional setting item reflection check box 2104. Steps S2011 to S2014 are similar to steps S1411 to S1414 according to the first exemplary embodiment. A description thereof will thus be omitted.

In step S2015, the data management unit 504 determines whether the value of the conditional setting item reflection checkbox 2104 received in step S2010 is checked. In a case where the data management unit 504 determines that the value of the conditional setting item reflection checkbox 2104 is checked (YES in step S2015), the processing proceeds to step S2016.

In a case where the data management unit 504 determines that the value of the conditional setting item reflection checkbox 2104 is not checked (NO in step S2015), the processing proceeds to step S2017.

In step S2016, the apparatus identification control unit 503 writes the apparatus identification information into the common data by a method similar to that of step S2012. Such processing enables the data processing unit 803 to reflect the setting item(s) with a reflection condition, included in the common data on the information processing apparatus 111.

Steps S2017 and S2018 are similar to steps S1415 and S1416 according to the first exemplary embodiment. A description thereof will thus be omitted.

Step S1204 and subsequent steps according to the fourth exemplary embodiment are similar to those of the first exemplary embodiment. A description thereof will thus be omitted.

According to the foregoing first to fourth exemplary embodiments, the automatic installation program 800 separately performs the reflection processing on the common data and the individual data in the client environment 110 (for example, steps S1507 and S1512 of the first exemplary embodiment).

Depending on setting items, an information processing apparatus may need to be restarted after reflection. According to the foregoing exemplary embodiments, an information processing apparatus may need to be restarted as often as twice. In a fifth exemplary embodiment, data is reflected on an information processing apparatus at a single time so that the setup operations become more efficient.

A configuration and operation according to the present exemplary embodiment will be described below as compared with the first and fourth exemplary embodiments.

Step S1201 according to the fifth exemplary embodiment is similar to step S1201 (steps S1901 to S1906) according to the fourth exemplary embodiment. A description thereof will thus be omitted. In other words, the data input/output unit 502 analyses the setting items and deletes unnecessary setting items when registering the common data.

Step S1202 according to the fifth exemplary embodiment is similar to step S1202 according to the first exemplary embodiment. A description thereof will thus be omitted.

The data finalization processing of step S1203 according to the present exemplary embodiment will be described as compared with the data finalization processing of step S1203 according to the first exemplary embodiment.

FIG. 22 is a flowchart illustrating the system setting method of the information processing system according to the present exemplary embodiment. In the present example, the processing of step S1203 illustrated in FIG. 12 is applied to the present exemplary embodiment. In the flowchart, steps S2201 to S2214 are similar to steps S1401 to S1414. A description thereof will thus be omitted. The steps are implemented by the CPU 301 of the information processing apparatus 111 and the CPU 201 of the management apparatus 102 executing stored control programs. In the following description, the modules illustrated in FIG. 5 are described as agents.

In step S2215, the data management unit 504 determines whether there is an identical setting item or items in the copy of the individual data and the copy of the common data obtained in steps S2211 and S2214. Setting values may be different. In a case where the data management unit 504 determines that there is an identical setting item(s) (YES in step S2215), the processing proceeds to step S2216. In a case where the data management unit 504 determines that there is no identical setting item (NO in step S2215), the processing proceeds to step S2218.

In step S2216, the data management unit 504 deletes the setting item(s) determined to be identical in step S2215 from the copy of the common data obtained in step S2214.

In step S2217, the data management unit 504 adds the setting item(s) of the copy of the common data generated in step S2216 to the copy of the individual data obtained in step S2211. This step is performed to merge the common data and the individual data so that a piece of individual data is generated. In step S2218, the data management unit 504 sends back the individual data generated in step S2217 and the information thereof to the automatic installation program 800. Step S2219 is similar to step S1416. A description thereof will thus be omitted.

Steps S1204 to S1209 according to the present exemplary embodiment are similar to steps S1204 to S1209 according to the first exemplary embodiment. A description thereof will thus be omitted.

According to the foregoing exemplary embodiments, initial setting can be accurately completed by using common data and individual data generated in advance even if the statuses of the information processing apparatuses to be installed are not finalized.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-209794, filed Oct. 14, 2014, which is hereby incorporated by reference herein in its entirety.

What is claimed is:

1. A management apparatus configured to communicate with a plurality of information processing apparatuses, the management apparatus comprising:
   a memory storing instructions; and
   a processor coupled to the memory that, upon execution of the stored instructions is operable to control a generation unit configured to generate common data to be set into the plurality of information processing apparatuses in common and individual data to be individually set into any one of the plurality of information processing apparatuses, in such a manner that the common data and the individual data are associated with an installation location, identification information for identifying an information processing apparatus to be set being not finalized for the any one of the plurality of information processing apparatuses;

a management unit configured to register and manage the generated common data and the generated individual data in a storage unit;

a first reception unit configured to receive an acquisition request for data to be set from any one of the plurality of information processing apparatuses along with identification information for identifying an information processing apparatus;

a reply unit configured to send back a list of individual data registered to the information processing apparatus from which the acquisition request is received; and a distribution unit configured to distribute individual data on which a setting location is finalized and the common data to the information processing apparatus from which the acquisition request is received, based on information for identifying any pieces of individual data notified from the information processing apparatus.

2. The management apparatus according to claim 1, wherein the list of individual data includes information for identifying an installation location where the information processing apparatus is to be installed.

3. The management apparatus according to claim 1, further comprising:

a first display control unit configured to display a confirmation screen of individual data to be individually set into any one of the plurality of information processing apparatuses, identification information for identifying an information processing apparatus to be set being finalized for the any one of the plurality of information processing apparatus; and a replacement unit configured to replace finalized identification information with input identification information in response to a change request for the individual data displayed on the confirmation screen.

4. The management apparatus according to claim 1, further comprising a first determination unit configured to determine whether a request that setting data of another information processing apparatus is to be used is added to the acquisition request for data to be set received from the information processing apparatus, wherein the reply unit is configured to send back, in a case where the first determination unit determines that the request that setting data of another information processing apparatus is to be used is added, a list of individual data of another information processing apparatus to the information processing apparatus.

5. The management apparatus according to claim 1, further comprising:

an extraction unit configured to extract setting data not to be reflected on the common data registered in the storage unit;

a second display control unit configured to display a list of the extracted setting data on a display unit; and a second reception unit configured to receive setting data not to be set from the list of the setting data displayed on the display unit, wherein the management unit is configured to register, into the storage unit, common data from which the setting data received by the second acceptance unit is deleted.

6. The management apparatus according to claim 1, further comprising:

a second determination unit configured to determine whether the individual data includes a setting item identical to an setting item included in the common data;

a deletion unit configured to delete, in a case where the second determination unit determines that the individual data includes a setting item identical to a setting item included in the common data, the identical setting item from the common data; and an addition unit configured to add the identical setting item deleted by the deletion unit to the individual data.

7. An information processing apparatus configured to communicate with a management apparatus, the information processing apparatus comprising:

a memory storing instructions; and a processor coupled to the memory that, upon execution of the stored instructions is operable to control a transmission unit configured to transmit, to the management apparatus, a request to obtain individual data and common data to be set along with identification information for identifying the information processing apparatus;

an acquisition unit configured to obtain a list of individual data including information for identifying an installation location from the management apparatus;

a display unit configured to display the obtained list of individual data on a selection screen which is for selecting individual data to be set using the information for identifying an installation location;

a selection unit configured to select individual data to be set from the obtained list of individual data via the displayed selection screen;

a reply unit configured to send back information for identifying the selected individual data to the management apparatus; and a reflection unit configured to perform initial setting based on individual data and common data obtained from the management apparatus.

8. The information processing apparatus according to claim 7, further comprising a notification unit configured to notify the management unit of a result of reflection by the reflection unit.

9. The information processing apparatus according to claim 8, wherein the notification unit is configured to notify the management unit of a result of reflection of the individual data and a result of reflection of the common data separately.

10. A method for controlling a management apparatus configured to communicate with a plurality of information processing apparatuses, the method comprising:

generating common data to be set into the plurality of information processing apparatuses in common and individual data to be individually set into any one of the plurality of information processing apparatuses, in such a manner that the common data and the individual data are associated with an installation location, identification information for identifying an information processing apparatus to be set being not finalized for the any one of the plurality of information processing apparatuses;

registering and managing the generated common data and the generated individual data in a storage unit;

receiving an acquisition request for data to be set from any one of the plurality of information processing apparatuses along with identification information for identifying an information processing apparatus;

sending back a list of individual data registered to the information processing apparatus from which the acquisition request is received; and distributing individual data on which a setting location is finalized and the common data to the information processing apparatus from which the acquisition request is received, based on information for identifying any pieces of individual data notified from the information processing apparatus.

11. A method for controlling an information processing apparatus configured to communicate with a management apparatus, the method comprising:

transmitting, to the management apparatus, a request to obtain individual data and common data to be set along with identification information for identifying the information processing apparatus;

obtaining a list of individual data including information for identifying an installation location from the management apparatus;

displaying the obtained list of individual data on a selection screen which is for selecting individual data to be set using the information for identifying an installation location;

selecting individual data to be set from the obtained list of individual data via the displayed selection screen;

sending back information for identifying the selected individual data to the management unit; and performing initial setting based on individual data and common data obtained from the management apparatus.

12. A non-transitory computer-readable storage medium storing a program for causing a computer to function as:

a generation unit configured to generate common data to be set into a plurality of information processing apparatuses in common and individual data to be individually set into any one of the plurality of information processing apparatuses, in such a manner that the common data and the individual data are associated with an installation location, identification information for identifying an information processing apparatus to be set being not finalized for the any one of the plurality of information processing apparatuses;

a management unit configured to register and manage the generated common data and the generated individual data in a storage unit;

a first reception unit configured to receive an acquisition request for data to be set from any one of the plurality of information processing apparatuses along with identification information for identifying an information processing apparatus;

a reply unit configured to send back a list of individual data registered to the information processing apparatus from which the acquisition request is received; and a distribution unit configured to distribute individual data on which a setting location is finalized and the common data to the information processing apparatus from which the acquisition request is received, based on information for identifying any of pieces of individual data notified from the information processing apparatus.

13. A non-transitory computer-readable storage medium storing a program for causing a computer to function as:

a transmission unit configured to transmit, to the management apparatus, a request to obtain individual data and common data to be set along with identification information for identifying the information processing apparatus;

an acquisition unit configured to obtain a list of individual data including information for identifying an installation location from the management apparatus;

a display unit configured to display the obtained list of individual data on a selection screen which is for selecting individual data to be set using the information for identifying an installation location;

a selection unit configured to select individual data to be set from the obtained list of individual data via the displayed selection screen;

a reply unit configured to send back information for identifying the selected individual data to the management apparatus; and a reflection unit configured to perform initial setting based on individual data and common data obtained from the management apparatus.

* * * * *